United States Patent
Han et al.

(10) Patent No.: US 9,374,806 B2
(45) Date of Patent: Jun. 21, 2016

(54) DYNAMIC HYBRID AUTOMATIC REPEAT REQUEST-ACKNOWLEDGEMENT (HARQ-ACK) TRANSMISSION WITH ENHANCED PHYSICAL DOWNLINK CONTROL CHANNELS

(71) Applicant: Intel Corporation, Santa Clara, CA (US)

(72) Inventors: Seunghee Han, Anyang-si (KR); Yuan Zhu, Beijing (CN); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/125,706

(22) PCT Filed: Sep. 27, 2013

(86) PCT No.: PCT/US2013/062132
§ 371 (c)(1),
(2) Date: Dec. 12, 2013

(87) PCT Pub. No.: WO2014/052730
PCT Pub. Date: Apr. 3, 2014

(65) Prior Publication Data
US 2015/0195822 A1    Jul. 9, 2015

Related U.S. Application Data

(60) Provisional application No. 61/707,784, filed on Sep. 28, 2012.

(51) Int. Cl.
*H04W 72/04* (2009.01)
*H04W 72/12* (2009.01)
(Continued)

(52) U.S. Cl.
CPC ......... *H04W 72/0413* (2013.01); *H04L 1/1812* (2013.01); *H04L 5/0035* (2013.01);
(Continued)

(58) Field of Classification Search
None
See application file for complete search history.

(56) References Cited

U.S. PATENT DOCUMENTS

| 7,461,253 B2 | 12/2008 | Braskich et al. |
| 8,976,954 B1 | 3/2015 | Williams et al. |

(Continued)

FOREIGN PATENT DOCUMENTS

| BE | 1020890 A5 | 7/2014 |
| CN | 103581880 A | 2/2014 |

(Continued)

OTHER PUBLICATIONS

"U.S. Appl. No. 13/706,098, Final Office Action mailed Dec. 17, 2014", 24 pgs.

(Continued)

*Primary Examiner* — Ashley Shivers
(74) *Attorney, Agent, or Firm* — Schwegman Lundberg & Woessner, P.A.

(57) ABSTRACT

Embodiments of a system and method for providing dynamic hybrid automatic repeat request-acknowledgement (HARQ-ACK) transmission with enhanced physical downlink control channels are generally described herein. In some embodiments, a receiver is arranged to receive, on an enhanced physical downlink control channel (ePDCCH), one of a lowest control channel element index ($n_{CCE}$) and a lowest enhanced control channel element index ($n_{eCCE}$), a user equipment specific starting offset ($N_{PUCCH}^{(1)}$) and at least one additional offset-related parameter. A processor determines allocation of an uplink resource of a physical uplink control channel (PUCCH) for HARQ-ACK transmission based the one of a lowest control channel element index ($n_{CCE}$) and a lowest enhanced control channel element index ($n_{eCCE}$), the user equipment specific starting offset ($N_{PUCCH}^{(1)}$) and at least one selected from the at least one additional offset-related parameter. A transmitter transmits a signal on the PUCCH using the allocated uplink resource.

25 Claims, 9 Drawing Sheets

(51) Int. Cl.

| | | |
|---|---|---|
| *H04W 74/00* | (2009.01) | |
| *H04L 5/00* | (2006.01) | |
| *H04W 52/02* | (2009.01) | |
| *H04W 48/14* | (2009.01) | |
| *H04W 72/02* | (2009.01) | |
| *H04W 76/02* | (2009.01) | |
| *H04W 88/02* | (2009.01) | |
| *H04L 1/18* | (2006.01) | |
| *H04W 36/08* | (2009.01) | |
| *H04W 48/18* | (2009.01) | |

(52) U.S. Cl.
CPC ............ *H04L5/0055* (2013.01); *H04W 48/14* (2013.01); *H04W 52/0209* (2013.01); *H04W 52/0212* (2013.01); *H04W 52/0235* (2013.01); *H04W 72/02* (2013.01); *H04W 72/042* (2013.01); *H04W 72/044* (2013.01); *H04W 72/0406* (2013.01); *H04W 72/1284* (2013.01); *H04W 74/002* (2013.01); *H04W 74/004* (2013.01); *H04W 76/025* (2013.01); *H04W 88/02* (2013.01); *H04W 36/08* (2013.01); *H04W 48/18* (2013.01); *H04W 52/0261* (2013.01); *Y02B 60/50* (2013.01)

(56) References Cited

U.S. PATENT DOCUMENTS

| | | |
|---|---|---|
| 8,989,114 B2 | 3/2015 | Kim et al. |
| 2002/0184373 A1 | 12/2002 | Maes |
| 2006/0031378 A1 | 2/2006 | Vallapureddy et al. |
| 2007/0003062 A1 | 1/2007 | Mizikovsky et al. |
| 2007/0091889 A1 | 4/2007 | Xiao et al. |
| 2007/0109989 A1 | 5/2007 | Nakagawa et al. |
| 2008/0005568 A1 | 1/2008 | Watson et al. |
| 2008/0183339 A1 | 7/2008 | Vaswani et al. |
| 2009/0181670 A1 | 7/2009 | Tseng |
| 2009/0264124 A1 | 10/2009 | Rofougaran |
| 2009/0265542 A1 | 10/2009 | Khetawat et al. |
| 2010/0110896 A1 | 5/2010 | Tseng et al. |
| 2010/0110897 A1 | 5/2010 | Chun et al. |
| 2010/0272018 A1 | 10/2010 | Furueda et al. |
| 2010/0285810 A1 | 11/2010 | Ko et al. |
| 2010/0317343 A1 | 12/2010 | Krishnamurthy et al. |
| 2011/0002281 A1 | 1/2011 | Terry et al. |
| 2011/0078438 A1 | 3/2011 | Tie et al. |
| 2011/0086652 A1 | 4/2011 | So et al. |
| 2011/0116415 A1 | 5/2011 | Naito et al. |
| 2011/0143796 A1 | 6/2011 | Lee et al. |
| 2011/0170427 A1 | 7/2011 | Koivisto et al. |
| 2011/0201275 A1 | 8/2011 | Jabara et al. |
| 2011/0222466 A1 | 9/2011 | Pance et al. |
| 2011/0269449 A1 | 11/2011 | Kazmi et al. |
| 2011/0270984 A1 | 11/2011 | Park |
| 2011/0271334 A1 | 11/2011 | Yang et al. |
| 2011/0292912 A1 | 12/2011 | Zembutsu et al. |
| 2011/0305223 A1 | 12/2011 | Koo et al. |
| 2012/0002537 A1 | 1/2012 | Bao et al. |
| 2012/0044808 A1 | 2/2012 | Song |
| 2012/0064932 A1 | 3/2012 | Lim et al. |
| 2012/0113816 A1 | 5/2012 | Bhattad et al. |
| 2012/0144226 A1 | 6/2012 | Yang et al. |
| 2012/0165034 A1 | 6/2012 | Boudreau et al. |
| 2012/0176884 A1 | 7/2012 | Zhang et al. |
| 2012/0213261 A1 | 8/2012 | Sayana et al. |
| 2012/0220327 A1 | 8/2012 | Lee et al. |
| 2012/0282966 A1 | 11/2012 | Koo et al. |
| 2013/0024684 A1 | 1/2013 | Chunduri et al. |
| 2013/0100871 A1 | 4/2013 | Vujcic |
| 2013/0121220 A1 | 5/2013 | Virtej et al. |
| 2013/0172036 A1 | 7/2013 | Miklos et al. |
| 2013/0188558 A1 | 7/2013 | Nam et al. |
| 2013/0194931 A1* | 8/2013 | Lee ................... H04L 5/0053 370/241 |
| 2013/0196675 A1 | 8/2013 | Xiao et al. |
| 2013/0208604 A1 | 8/2013 | Lee et al. |
| 2013/0242897 A1 | 9/2013 | Meylan et al. |
| 2013/0244676 A1 | 9/2013 | Koivisto et al. |
| 2013/0279437 A1 | 10/2013 | Ng et al. |
| 2013/0322235 A1 | 12/2013 | Khoryaev et al. |
| 2013/0322352 A1 | 12/2013 | Han et al. |
| 2014/0003375 A1* | 1/2014 | Nam ................. H04W 72/0406 370/329 |
| 2014/0022988 A1 | 1/2014 | Davydov et al. |
| 2014/0036796 A1 | 2/2014 | Etemad et al. |
| 2014/0036810 A1 | 2/2014 | Harrison et al. |
| 2014/0092828 A1 | 4/2014 | Sirotkin |
| 2014/0092833 A1 | 4/2014 | Vannithamby et al. |
| 2014/0092878 A1 | 4/2014 | Davydov et al. |
| 2014/0094119 A1 | 4/2014 | Stojanovski et al. |
| 2014/0254530 A1 | 9/2014 | Kim et al. |
| 2014/0293973 A1 | 10/2014 | Lin et al. |
| 2014/0301345 A1 | 10/2014 | Kim et al. |
| 2015/0109982 A1 | 4/2015 | Futaki |
| 2015/0117286 A1 | 4/2015 | Kim et al. |
| 2015/0207604 A1 | 7/2015 | Sun et al. |
| 2015/0215091 A1 | 7/2015 | Lee et al. |
| 2015/0223050 A1 | 8/2015 | Yiu et al. |
| 2015/0223284 A1 | 8/2015 | Jain et al. |
| 2015/0305083 A1 | 10/2015 | Heo et al. |

FOREIGN PATENT DOCUMENTS

| | | | |
|---|---|---|---|
| CN | 104737485 | A | 6/2015 |
| CN | 104737619 | A | 6/2015 |
| CN | 104813693 | A | 7/2015 |
| CN | 104904303 | A | 9/2015 |
| EP | 2381709 | A1 | 10/2011 |
| EP | 2871896 | A1 | 5/2015 |
| EP | 2875588 | A | 5/2015 |
| EP | 2901574 | | 8/2015 |
| EP | 2901584 | | 8/2015 |
| EP | 2901603 | | 8/2015 |
| EP | 2901729 | | 8/2015 |
| EP | 2901740 | | 8/2015 |
| EP | 2901810 | | 8/2015 |
| EP | 2901811 | | 8/2015 |
| EP | 2918136 | | 9/2015 |
| ES | 2477040 | A2 | 7/2014 |
| FI | 124643 | B | 11/2014 |
| FR | 2993746 | | 1/2014 |
| JP | 2009171580 | A | 7/2009 |
| JP | 2012507971 | A | 3/2012 |
| JP | 2012100304 | A | 5/2012 |
| JP | 2012104951 | A | 5/2012 |
| JP | 2012520001 | A | 8/2012 |
| JP | 2012175641 | A | 9/2012 |
| JP | 2013533715 | A | 8/2013 |
| JP | 2015525525 | A | 9/2015 |
| KR | 1020090083269 | A | 8/2009 |
| KR | 1020100034675 | A | 4/2010 |
| KR | 1020100047449 | A | 5/2010 |
| KR | 1020110037420 | A | 4/2011 |
| KR | 1020110048422 | A | 5/2011 |
| KR | 1020110111234 | A | 10/2011 |
| KR | 1020120098899 | A | 9/2012 |
| KR | 1020150040989 | A | 4/2015 |
| KR | 1020150064016 | A | 6/2015 |
| TW | 201409980 | A | 3/2014 |
| WO | WO-2010101440 | A2 | 9/2010 |
| WO | WO-2011055999 | A2 | 5/2011 |
| WO | WO-2011100673 | A1 | 8/2011 |
| WO | WO-2011108889 | A2 | 9/2011 |
| WO | WO-2011116240 | A1 | 9/2011 |
| WO | WO-2011136321 | A1 | 11/2011 |
| WO | WO-2012021018 | A2 | 2/2012 |
| WO | WO-2012043524 | A1 | 4/2012 |
| WO | WO-2012057407 | A1 | 5/2012 |
| WO | WO-2012085637 | A1 | 6/2012 |
| WO | WO-2012094151 | A2 | 7/2012 |
| WO | WO-2012099319 | A1 | 7/2012 |
| WO | WO-2012109542 | A1 | 8/2012 |
| WO | WO-2013151404 | A1 | 10/2013 |

(56) References Cited

FOREIGN PATENT DOCUMENTS

| WO | WO-2014014576 A1 | 1/2014 |
|---|---|---|
| WO | WO-2014051951 A1 | 4/2014 |
| WO | WO-2014052175 A1 | 4/2014 |
| WO | WO-2014052303 A1 | 4/2014 |
| WO | WO-2014052730 A1 | 4/2014 |
| WO | WO-2014052774 A1 | 4/2014 |
| WO | WO-2014052850 A1 | 4/2014 |
| WO | WO-2014052877 A1 | 4/2014 |
| WO | WO-2014052905 A1 | 4/2014 |

OTHER PUBLICATIONS

"U.S. Appl. No. 13/706,098, Non Final Office Action mailed Jun. 4, 2015", 26 pgs.
"U.S. Appl. No. 13/706,098, Response filed Apr. 21, 2015 to Final Office Action mailed Dec. 17, 2014", 15 pgs.
"U.S. Appl. No. 13/706,098, Response filed Sep. 9, 2014 to Non-Final Office Action dated May 9, 2014", 10 pgs.
"U.S. Appl. No. 13/926,273, Non Final Office Action mailed Apr. 30, 2015", 22 pgs.
"U.S. Appl. No. 13/930,669, Non Final Office Action mailed Mar. 25, 2015", 11 pgs.
"U.S. Appl. No. 14/027,401, Preliminary Amendment filed Dec. 26, 2014", 16 pgs.
"Belgium Application Serial No. 2013/0503, Response filed May 5, 2014 to Belgium Search Report mailed Jul. 19, 2013", W/ English Claims, 13 pgs.
"Chinese Application Serial No. 201310304357.4, Preliminary Amendment filed Jun. 20, 2014", W/ English Claims, 8 pgs.
"Consideration on Reference Signal for E-PDCCH", InterDigital Communications, LLC, ingar i: 3GPP TSG RAN WG I Meeting #67, R1-113932, San, Francisco, USA, (Nov. 9, 2011).
"European Application Serial No. 13841346.3, Amendment filed Mar. 16, 2015", 18 pgs.
"European Application Serial No. 13841732.4, Amendment filed Feb. 13, 2015", 12 pgs.
"Finnish Application Serial No. 20135776, Office Action mailed Jul. 3, 2014", W/ English Translation, 2 pgs.
"Finnish Application Serial No. 20135776, Response filed Jun. 23, 2014 Office Action mailed Apr. 9, 2014", W/ English Claims, 13 pgs.
"International Application Serial No. PCT/US2013/044756, International Preliminary Report on Patentability mailed Jan. 29, 2015", 6 pgs.
"International Application Serial No. PCT/US2013/058153, International Preliminary Report on Patentability mailed Apr. 9, 2015", 7 pgs.
"International Application Serial No. PCT/US2013/060800, International Preliminary Report on Patentability mailed Apr. 9, 2015", 6 pgs.
"International Application Serial No. PCT/US2013/061379, International Preliminary Report on Patentability mailed Apr. 9, 2015", 9 pgs.
"International Application Serial No. PCT/US2013/062132, International Preliminary Report on Patentability mailed Apr. 9, 2015", 8 pgs.
"International Application Serial No. PCT/US2013/062210, International Preliminary Report on Patentability mailed Apr. 9, 2015", 15 pgs.
"International Application Serial No. PCT/US2013/062340, International Preliminary Report on Patentability mailed Apr. 9, 2015", 8 pgs.
"International Application Serial No. PCT/US2013/062379, International Preliminary Report on Patentability mailed Apr. 9, 2015", 9 pgs.
"International Application Serial No. PCT/US2013/062427, International Preliminary Report on Patentability mailed Apr. 9, 2015", 8 pgs.
"Korean Application Serial No. 10-2015-7005286, Amendment filed Feb. 27, 2015", W/ English Agent's Note on Amendments, 5 pgs.

"R1-121935: Interference Measurement Mechanism for Rel-11", 3GPP TSG RAN WG1 Meeting #69, (May 2012), 10 pgs.
"R1-124046: Final Report of 3GPP TSG RAN WG1 #70 v1.0.0", 3GPP TSG RAN WG1 Meeting #70bis, (Oct. 2012), 118 pgs.
"Spanish Application Serial No. P201331103, Office Action mailed Apr. 28, 2015", w/ English Translation, 8 pgs.
"Spanish Application No. P201331103, Office Action Mailed Sep. 22, 2014", W/ English Translation, 10 pgs.
"Spanish Application Serial No. P201331103, Response filed Jan. 30, 2015 to Office Action Mailed Sep. 22, 2014", W/ English Claim chart, 2 pgs.
"Swedish Application Serial No. 1350906-2, Office Action mailed Feb. 19, 2015", w/ English Translation, 32 pgs.
"Transmission mode and DCI content for Release 11", Renesas Mobile Europe Ltd, ingar i: 3GPP TSG-RAN WGI Meeting #69, R1-122357, Prague, Czech Republic, (May 12, 2012).
"UE assumption on colocation of antennas", Renesas Mobile Europe Ltd, ingar i: 3GPP TSG-RAN WG 1 Meeting #69, R 1-122334, Prague, Czech, Republic, (May 12, 2012).
"U.S. Appl. No. 13/706,098, Non Final Office Action mailed May 9, 2014", 21 pgs.
"U.S. Appl. No. 13/706,098, Preliminary amendment filed Sep. 12, 2013", 8 pgs.
"U.S. Appl. No. 14/125,749, Preliminary Amendment filed Dec. 12, 2013", 8 pgs.
"U.S. Appl. No. 14/126,252, Preliminary Amendment filed Dec. 13, 2013", 5 pgs.
"U.S. Appl. No. 14/127,830, Preliminary Amendment filed Dec. 19, 2013", 12 pgs.
"Belgium Application Serial No. 2013/0503, Belgium Search Report mailed Jul. 19, 2013", 9 pgs.
"Evolved Universal Terrestrial Radio Access (E-UTRA); Physical layer procedures", 3GPP TS 36.213 V10.6.0. Technical Specification Group Radio Access Network. Release 10., (Jun. 2012), 1-125.
"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.
"Evolved Universal Terrestrial Radio Access (E-UTRA); User Equipment (UE) procedures in idle mode", 3GPP TS 36.304 V11.1.0. Technical Specification Group Radio Access Network. (Release 11)., (Sep. 2012), 33 pgs.
"Finland Application Serial No. 20135776, Office Action mailed Apr. 9, 2014", English translation, 6 pgs.
"French Application Serial No. 1357011, Office Action mailed Nov. 26, 2013", 2 pgs.
"French Application Serial No. 1357011, Response filed Jan. 17, 2014 to Office Action mailed Nov. 26, 2013", English claims, 5 pgs.
"HARQ-ACK PUCCH Resources in Response to ePDCCH Detections", R1-122259, 3GPP TSG RAN WG1 #69. Prague, Czech Republic. Samsung., (May 21, 2012), 2 pgs.
"HARQ-ACK Transmission in Response to E-PDCCH Detection", R1-120193, 3GPP TSG RAN WG1 #68. Samsung., (Feb. 2012), 3 pgs.
"International Application Serial No. PCT/US2013/058153, International Search Report mailed Dec. 13, 2013", 3 pgs.
"International Application Serial No. PCT/US2013/058153, Written Opinion mailed Dec. 13, 2013", 5 pgs.
"International Application Serial No. PCT/US2013/060800, International Search Report mailed Jan. 16, 2014", 3 pgs.
"International Application Serial No. PCT/US2013/060800, Written Opinion mailed Jan. 16, 2014", 4 pgs.
"International Application Serial No. PCT/US2013/061379, International Search Report mailed Jan. 2, 2014", 3 pgs.
"International Application Serial No. PCT/US2013/061379, Written Opinion mailed Jan. 2, 2014", 7 pgs.
"International Application Serial No. PCT/US2013/062132, International Search Report mailed Jan. 28, 2014", 3 pgs.
"International Application Serial No. PCT/US2013/062132, Written Opinion mailed Jan. 28, 2014", 6 pgs.
"International Application Serial No. PCT/US2013/062210, International Search Report mailed Feb. 28, 2014", 4 pgs.

(56) References Cited

OTHER PUBLICATIONS

"International Application Serial No. PCT/US2013/062210, Invitation to Pay Additional Fees and Partial Search Report mailed Dec. 16, 2013", 7 pgs.
"International Application Serial No. PCT/US2013/062210, Written Opinion mailed Feb. 28, 2014", 13 pgs.
"International Application Serial No. PCT/US2013/062340, International Search Report mailed Jan. 28, 2014", 6 pgs.
"International Application Serial No. PCT/US2013/062340, Written Opinion mailed Jan. 28, 2014", 6 pgs.
"International Application Serial No. PCT/US2013/062379, International Search Report mailed Jan. 6, 2014", 6 pgs.
"International Application Serial No. PCT/US2013/062379, Written Opinion mailed Jan. 6, 2014", 7 pgs.
"International Application Serial No. PCT/US2013/062427, International Search Report mailed Jan. 6, 2014", 3 pgs.
"International Application Serial No. PCT/US2013/062427, Written Opinion mailed Jan. 6, 2014", 6 pgs.
"PUCCH Resource Allocation Corresponding to ePDCCH", R1-120666, 3GPP TSG RAN WG1 Meeting #68. ASUSTEK., (Feb. 2012), 2 pgs.
"PUCCH resource allocation for E-PDCCH", R1-120329, 3GPP TSG RAN1 #68. Pantech., (Feb. 2012), 2 pgs.
"PUCCH resource for ePDCCH", R1-123266, 3GPP TSG RAN WG1 Meeting #70. Qingdao, China. Sharp., (Aug. 13, 2012), 8 pgs.
"PUCCH resource mapping with ePDCCH", R1-114066, 3GPP TSG RAN WG1 Meeting #67. Alcatel-Lucent Shanghai Bell, Alcatel-Lucent., (Nov. 2011), 2 pgs.
Chou, Joey, et al., "M2M Polling services", IEEE C802.16p-11/0016r1. IEEE 802.16 Broadband Wireless Access Working Group., [Online] Retrieved From Internet: <http://dot16.org/ul_archive/archive11/archive.shtml>, (Mar. 13, 2011), 12 pgs.
Hayashi, Toshiki, "Evolved Packet Core (EPC) Network Equipment for Long Term Evolution (LTE)", Fujitsu Sci. Tech. J., vol. 48, No. 1, (Jan. 2011), 17-20.
"International Application Serial No. PCT/US2013/044756, International Search Report mailed Nov. 15, 2013", 3 pgs.
"International Application Serial No. PCT/US2013/044756, Written Opinion mailed Nov. 15, 2013", 4 pgs.
Davies, Thomas, "Linux Ethernet Bonding Driver HOWTO", https://www.kernel.org/doc/Documentation/networking/bonding.txt.
Je, Hui Won, et al., "Long-Term Channel Information-Based CoMP Beamforming in LTE-Advanced Systems", 2011 IEEE Global Telecommunications Conference (GLOBECOM 2011), 1-6.
"U.S. Appl. No. 13/706,098, Examiner Interview Summary mailed Oct. 28, 2015", 3 pgs.
"U.S. Appl. No. 13/706,098, Response filed Oct. 21, 2015 to Non Final Office Action mailed Jun. 4, 2015", 14 pgs.
"U.S. Appl. No. 13/926,273, Response filed Sep. 30, 2015 to Non Final Office Action mailed Apr. 30, 2015", 11 pgs.
"U.S. Appl. No. 13/930,669, Notice of Allowance mailed Oct. 13, 2015", 5 pgs.
"U.S. Appl. No. 13/930,669, Response filed Jun. 25, 2015 to Non Final Office Action mailed Mar. 25, 2015", 12 pgs.
"U.S. Appl. No. 14/012,062, Non Final Office Action mailed Jul. 23, 2015", 15 pgs.
"U.S. Appl. No. 14/012,062, Response filed Oct. 23, 2015 to Non Final Office Action mailed Jul. 23, 2015", 11 pgs.
"U.S. Appl. No. 14/027,401, Non Final Office Action mailed Aug. 26, 2015", 35 pgs.
"U.S. Appl. No. 14/027,401, Response filed Dec. 28, 2015 to Non Final Office Action mailed Aug. 26, 2015", 18 pgs.
"U.S. Appl. No. 14/125,749, Non Final Office Action mailed Sep. 10, 2015", 10 pgs.
"U.S. Appl. No. 14/125,749, Response Filed Dec. 9, 2015 to Non Final Office Action mailed Sep. 10, 2015", 10 pgs.
"Chinese Application Serial No. 201380043775.0, Preliminary Amendment filed Oct. 19, 2015", W/ English Claims, 14 pgs.
"Chinese Application Serial No. 201380045150.8, Preliminary Amendment Filed Oct. 8, 2015", w/ English Claims, 41 pgs.
"Chinese Application Serial No. 201380045631.9, Preliminary Amendment filed Oct. 20, 2015", W/ English Claims, 27 pgs.
"European Application Serial No. 13819538.3, Extended European Search Report mailed Dec. 23, 2015", 8 pgs.
"European Application Serial No. 13819538.3, Office Action mailed Mar. 5, 2015", 2 pgs.
"European Application Serial No. 13819538.3, Response filed Sep. 9, 2015 to Office Action mailed Mar. 5, 2015", 9 pgs.
"Japanese Application Serial No. 2015-528726, Office Action mailed Nov. 4, 2015", W/ English Translation, 9 pgs.
"Japanese Application Serial No. 2015-528730, Office Action mailed Nov. 4, 2015", W/ English Translation, 11 pgs.
"Netherlands Application Serial No. 2011185, Office Action mailed May 27, 2015", w/ English Translation, 10 pgs.
"Netherlands Application Serial No. 2011185, Response filed Aug. 3, 2015 to Office Action mailed May 27, 2015", W/ English Claims, 9 pgs.
"Spanish Application Serial No. P201331103, Office Action Mailed Jun. 30, 2015", in English, 3 pgs.
"Spanish Application Serial No. P201331103,Respnse filed Jun. 22, 2015 to Office Action mailed Apr. 28, 2015", W/ English Claims, 19 pgs.
"Swedish Application Serial No. 1350906-2, Response filed May 19, 2015 to Office Action mailed Feb. 19, 2015", W/ English Claims, 17 pgs.
"Taiwanese Application Serial No. 102125395, Office Action mailed Jun. 22, 2015", w/ English Translation, 22 pgs.
"Taiwanese Application Serial No. 102125395, Response filed Sep. 21, 2015 to Office Action mailed Jun. 22, 2015", W/ English Claims, 28 pgs.
"Taiwanese Application Serial No, 102125395, Response filed Oct. 16, 2015 to Office Action mailed Jun. 22, 2015", W/ Partial English Claims, 6 pgs.
Fazackerley, et al., "Cluster head selection using RF signal strength", IEEEE lectrical and Computer Engineering, (2009), 334-338.
Huawei, Hisilicon, "Remaining details of CSI-RS configuration", 3GPP TSG-RAN WG1#68b R1-120984, [Online]. Retrieved from the Internet:, (Mar. 30, 2012).
European Application Serial. No. 13841050.1, Extended European Search Report mailed Mar. 23, 2016, 10 pgs.
"HARQ-ACK PUCCH Resources in Response to E-PDCCH Detections", Samsung, R1-121647, 3GPP, (Mar. 20, 2012).
"Japanese Application Serial No. 2015-534731, Notice of Reasons for Rejection mailed Mar. 1, 2016", W/ English Translation, 8 pgs.
"Remaining Issues on Resource Allocation for TDD PUCCH format 3", LG Electronics, R1-111692, 3GPP, (May 3, 2011).
"Views on PUCCH Resource Allocation for ePDCCH", NTT Docomo, R1-123554, 3GPP, (Aug. 5, 2012).
"WF on PUCCH Format 1a/1b resource allocation for ePDCCH based HARQ-ACKs", Sharp, Nokia Siemens Networks, Nokia, Samsung, Docomo, WF R1-123975, 3GPP, (Aug. 17, 2012).

* cited by examiner

DYNAMIC HYBRID AUTOMATIC REPEAT REQUEST-ACKNOWLEDGEMENT (HARQ-ACK) TRANSMISSION WITH ENHANCED PHYSICAL DOWNLINK CONTROL CHANNELS

RELATED APPLICATION

This application is a National Stage Application under 35 U.S.C. 371 of International Application No. PCT/US2013/062132, filed Sep. 27, 2013, which application claims the benefit of priority to U.S. Provisional Patent Application Ser. No. 61/707,784, filed on Sep. 28, 2012, and entitled "ADVANCED WIRELESS COMMUNICATION SYSTEMS AND TECHNIQUES," which applications are hereby incorporated by reference in their entirety.

BACKGROUND

In a 3GPP network, the physical uplink control channel (PUCCH) is used to transmit uplink control information (UCI) from User Equipment (UE) to a 3GPP eNodeB (eNB). An example of the UCI information is an acknowledgement signal in a Hybrid Automatic Repeat reQuest-ACKnowledgement (HARQ-ACK) process. Typically, PUCCH resources are dynamically allocated to a mobile station based upon the lowest carrier control element (CCE) index of a signal transmitted on the PDCCH by the eNB using one or more CCEs. Because the PDCCH transmission is unique to a given UE, use of the CCE index would result in the UE being assigned a unique uplink resource on the PUCCH.

However, an enhanced physical downlink control channel (ePDCCH) using one or more enhanced carrier control elements (eCCEs) has recently been introduced to the 3GPP specifications. The uplink resource of the PUCCH may be based on the lowest eCCE index for one or more eCCEs used for a transmission on the ePDCCH. In certain instances the lowest CCE index and the lowest eCCE index may be in the same. In these instances, an uplink resource allocated to a first UE using the lowest CCE index of the PDCCH may be the same as an uplink resource allocated to a second UE using the lowest eCCE index of the ePDCCH, resulting in a resource allocation collision.

Cell-specific reference signals (CRS) may be transmitted in DL subframes except for multimedia broadcast/multicast service (MBMS) regions in multimedia broadcast/multicast service network (MBSFN) subframes. In a certain carrier, with non-backward compatibility, CRS can be removed or reduced to increase DL throughput as well as to provide network energy saving. Also, legacy PDCCH is not transmitted but PDSCH is scheduled by either ePDCCH or cross-carrier scheduling from legacy cells using legacy PDCCH.

In a heterogeneous network with low power RRHs within the macrocell coverage are, e.g., coordinated multipoint (CoMP) scenario 4, the transmission/reception points created by the RRHs have the same cell IDs as the macro cell. Since the same physical Cell ID is used for several RRHs, the capacity for CRS based PDCCH is limited. This is mainly due to the CRS is transmitted from the RRHs as well as from macro cells in a synchronous or quasi-synchronous manner. Accordingly, enhanced PDCCH has been proposed to address PDCCH capacity.

To reduce overhead and inter-cell interference levels, a new carrier type (NCT) has been introduced. The new carrier type is complementary to legacy carrier type(s) and is backward compatible. For example, ePDCCH may be transmitted on the new carrier type (NCT). However, a resource allocation method has not been developed for ePDCCH transmitted on NCT. Moreover, dynamic resource allocation of HARQ-ACK transmission has not been adequately addressed.

DETAILED DESCRIPTION

Embodiments described herein provide dynamic hybrid automatic repeat request-acknowledgement (HARQ-ACK) transmission with enhanced physical downlink control channels. A lowest control channel element (CCE) index ($n_{CCE}$), a lowest enhanced control channel element index (neCCE), a user equipment specific starting offset ($N_{PUCCH}^{(1)}$) and at least one additional offset-related parameter may be received on an enhanced physical downlink control channel (ePDCCH). Allocation of an uplink resource of a physical uplink control channel (PUCCH) for Hybrid Automatic Repeat reQuest-ACKnowledgement (HARQ-ACK) transmission may be determined based the one of the lowest control channel element index ($n_{CCE}$) and the lowest enhanced control channel element index (neCCE), the user equipment specific starting offset ($N_{PUCCH}^{(1)}$) and at least one selected from the at least one additional offset-related parameter. Subframe stacking may be provided for the enhanced physical downlink control channel (ePDCCH) sets and the starting offset may be overridden in uplink (UL) coordinated multipoint (CoMP). The offset value acknowledgement (ACK)/non-acknowledgement (NACK) resource indicator (ARI) is replaced with ARO (ACK/NACK Resource Offset). The offset ARO is used only for primary cell (PCell). ARO may be used as an ACK/NACK resource indicator in the primary cell, for example, to indicate the PUCCH resource among the configured resources) in PCell. Transmit power control (TPC) commands are used in the primary cell as a real TPC for time division duplex (TDD) with downlink assignment index (DAI)>1.

Figure 1:
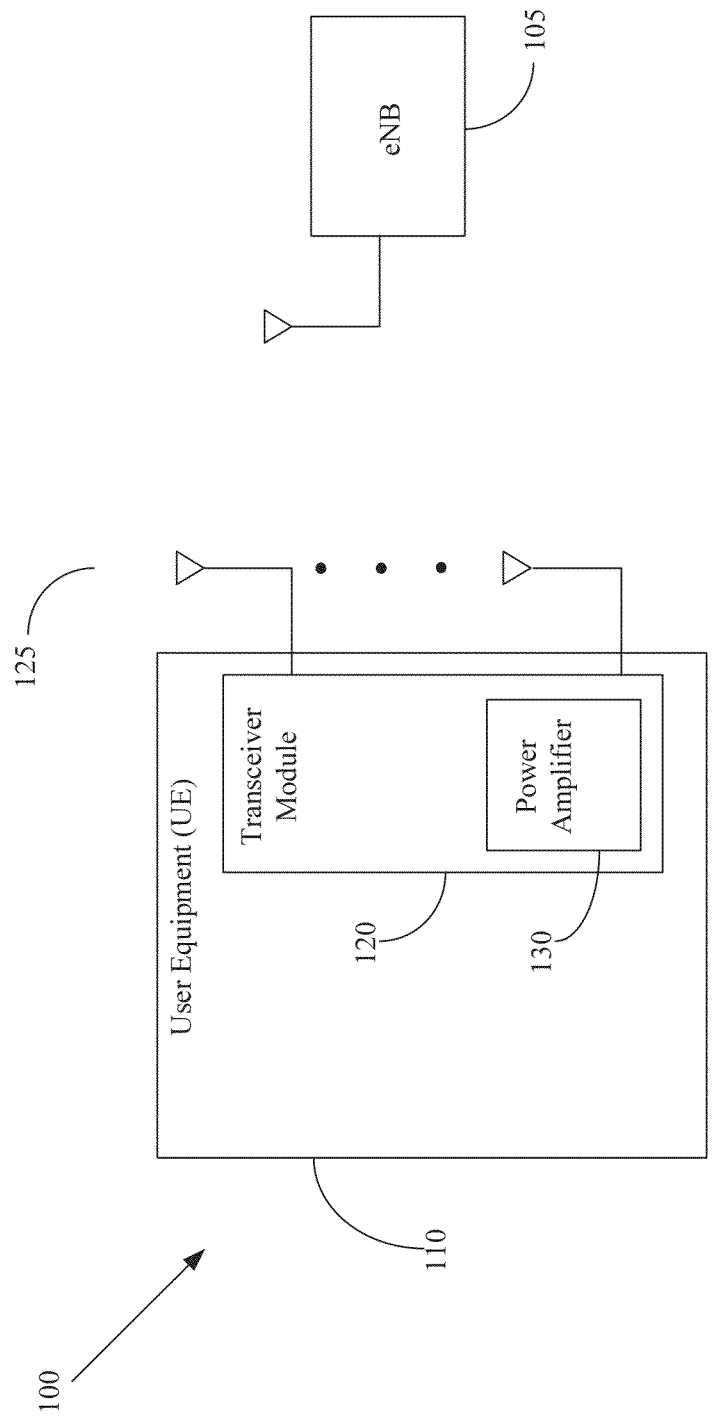
FIG. 1 schematically illustrates a high-level example of a network system comprising a UE and an eNB, in accordance with various embodiments.

FIG. 1 schematically illustrates a wireless communication network 100 in accordance with various embodiments. Wireless communication network 100 (hereinafter "network 100") may be an access network of a 3GPP LTE network such as evolved universal terrestrial radio access network ("E-UTRAN"). The network 100 may include an eNB 105, configured to wirelessly communicate with a UE 110.

As shown in FIG. 1, the UE 110 may include a transceiver module 120. The transceiver module 120 may be further coupled with one or more of a plurality of antennas 125 of the UE 110 for communicating wirelessly with other components of the network 100, e.g., eNB 105. The antennas 125 may be powered by a power amplifier 130 which may be a component of the transceiver module 120, as shown in FIG. 1, or may be a separate component of the UE 110. In one embodiment, the power amplifier provides the power for the transmissions on the antennas 125. In other embodiments, there may be multiple power amplifiers on the UE 110. Multiple antennas 125 allow the UE 110 to use transmit diversity techniques such as spatial orthogonal resource transmit diversity (SORTD).

Figure 2:
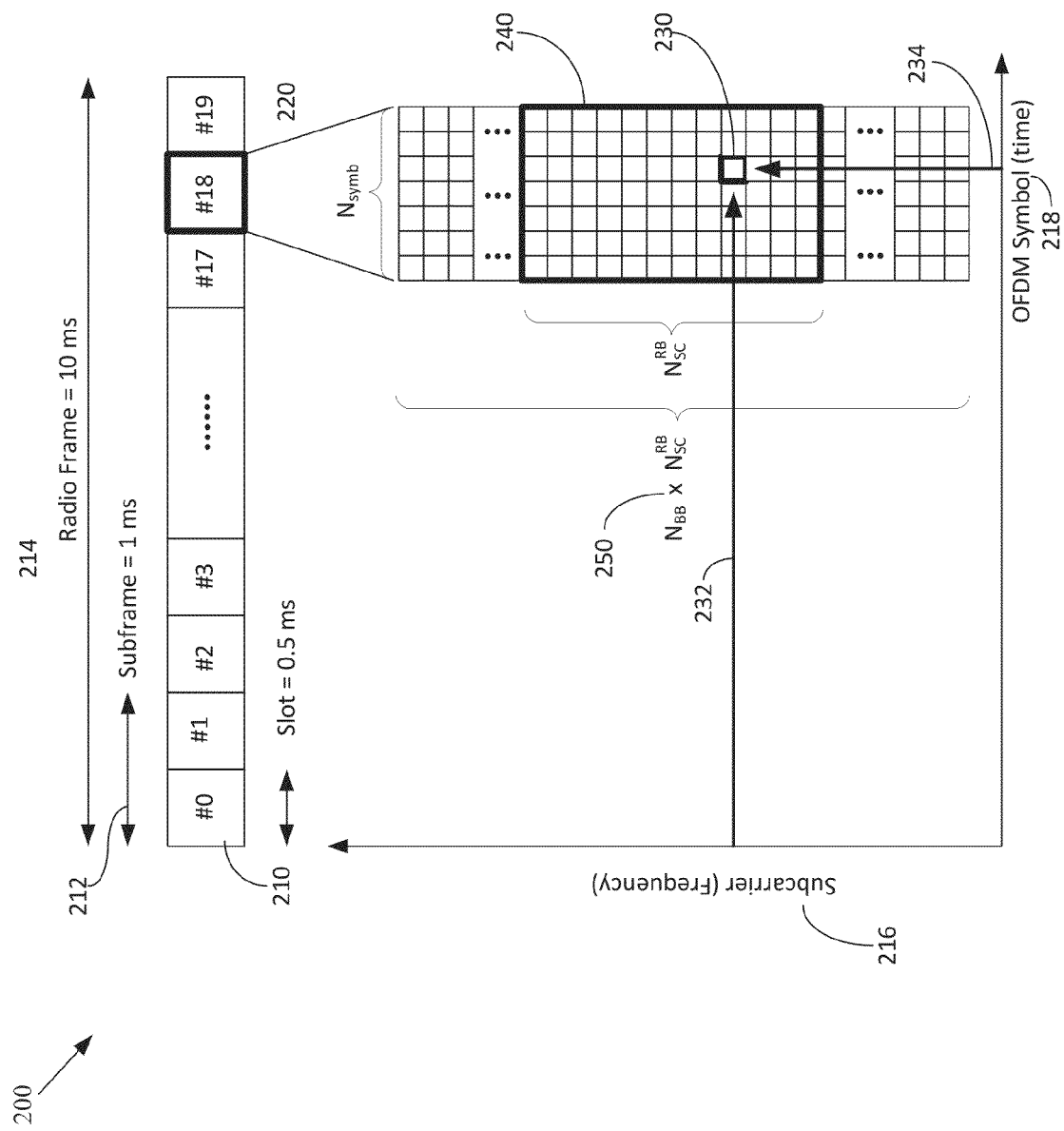
FIG. 2 illustrates a radio frame structure according to an embodiment.

FIG. 2 illustrates a radio frame structure 200 according to an embodiment. In FIG. 2, the radio frame 200 has an overall length of 10 ms 214. This is then divided into a total of 20 individual slots 210. Each subframe 212 includes of two slots 210 of length 0.5 ms, and each slot 210 contains a number of OFDM symbols, Nsymb 220. Thus, there are 10 subframes 212 within frame 200. Subframe #18 is shown expanded with reference to a subcarrier (frequency) axis 216 and an OFDM symbol (time) axis 218.

A resource element (RE) 230 is the smallest identifiable unit of transmission and includes a subcarrier 232 for an OFDM symbol period 234. Transmissions are scheduled in larger units called resource blocks (RBs) 240 which comprise a number of adjacent subcarriers 232 for a period of one 0.5 ms timeslot. Accordingly, the smallest dimensional unit for assigning resources in the frequency domain is a "resource block" (RB) 240, i.e., a group of N_sc^RB adjacent subcarriers 232 constitute a resource block (RB) 240. Each subframe 212 includes "NRB" resource blocks, i.e., the total number of the subcarriers within subframe NRB×N_sc^RB 250.

The CSI-IM resource elements may be configured as resource elements of zero-power (ZP) CSI-RS. ZP CSI-RS may be referred to as muted CSI-RSs or muted resource elements (REs). A zero-power CSI-RS is a CSI-RS pattern wherein the resource elements are not used, i.e., there is no transmitted signal on those resource elements. In some cases zero-power CSI-RS is a set of REs, where UE may assume no transmission. Therefore, a ZP CSI-RS has the same structure as a non-muted CSI-RS except that nothing is actually transmitted on the corresponding resource elements. One use of ZP CSI-RS is to be able to create "transmission holes" corresponding to data transmissions in other (neighboring) cells to facilitate interference measurement using CSI-IM. Another intention of ZP CSI-RS is to be able to create "transmission holes" corresponding to actual CSI-RS transmissions in other (neighboring) cells. This makes it possible for a terminal to receive CSI-RS of neighboring cells without interference from CSI-RS transmissions in its own cell. Accordingly, ZP CSI-RSs may be used to raise the signal-to-interference-plus-noise ratio (SINR) for CSI-RS in a given cell by configuring ZP CSI-RS in interfering cells so that the resource elements that otherwise cause interference are silent.

One or several CSI-IMs may be configured by the network for the purpose of interference measurements (e.g. to have different interference measurements for CSIs corresponding to data blanking or data transmission from cooperating node(s)).

The physical downlink control channel (PDCCH) carries scheduling assignments and other control information. A physical control channel is transmitted on an aggregation of one or several consecutive control channel elements (CCEs), where a control channel element corresponds to 9 resource element groups. The number of resource-element groups not assigned to PCFICH or PHICH is $N_{REG}$. The CCEs available in the system are numbered from 0 to $N_{CCE}-1$, where $N_{CCE}=\lfloor N_{REG}/19 \rfloor$. The PDCCH supports multiple formats as listed in Table 1. A PDCCH consisting of n consecutive CCEs may only start on a CCE fulfilling i mod n=0, where i is the CCE number. Multiple PDCCHs can be transmitted in a subframe.

TABLE 1

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

The block of bits $b(i)(0), \ldots, b(i)(M_{bit}^{(1)}-1)$ on each of the control channels to be transmitted in a subframe, where $M_{bit}^{(1)}$ is the number of bits in one subframe to be transmitted on physical downlink control channel number i, is multiplexed, resulting in a block of bits $b(0)(0), \ldots, b(0)(M_{bit}^{(0)}-1), b(1)(0), \ldots, b(1)(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$, where $n_{PDCCH}$ is the number of PDCCHs transmitted in the subframe.

The block of bits $b(0)(0), \ldots, b(0)(M_{bit}^{(1)}-1), b(1)(0), \ldots, b(1)(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ is scrambled with a cell-specific sequence prior to modulation, resulting in a block of scrambled bits $\tilde{b}(0), \ldots, \tilde{b}(M_{tot}-1)$ according to:

$\tilde{b}(i)=(b(i)+c(i))\mod 2.$

The scrambling sequence generator is initialised with $c_{init}=\lfloor n_s/2 \rfloor 2^9 + N_{ID}^{cell}$ at the start of each subframe.

CCE number n corresponds to bits $b(72n), b(72n+1), \ldots, b(72n+71)$. If necessary, <NIL> elements are inserted in the block of bits prior to scrambling to ensure that the PDCCHs starts at the CCE positions and to ensure that the length $M_{tot}=8N_{REG} \geq \Sigma_{i=0}^{n_{PDCCH}-1} M_{bit}^i$ of the scrambled block of bits matches the amount of resource-element groups not assigned to PCFICH or PHICH.

The block of scrambled bits $\tilde{b}(0), \ldots, \tilde{b}(M_{tot}-1)$ are modulated, resulting in a block of complex-valued modulation symbols $d(0), \ldots, d(M_{symb}-1)$. Modulation mappings applicable for the physical downlink control channel are shown in Table 2.

TABLE 2

| Physical channel | Modulation schemes |
| --- | --- |
| PDCCH | QPSK |

The block of modulation symbols $d(0), \ldots, d(M_{symb}-1)$ are mapped to layers according to one of Sections 6.3.3.1 or 6.3.3.3 with $M_{symb}^{(0)}=M_{symb}$ and preceded according to one of Sections 6.3.4.1 or 6.3.4.3, resulting in a block of vectors $y(i)=[y^{(0)}(i) \ldots y^{(P-1)}(i)]$, $i=0, \ldots M_{symb}-1$ to be mapped onto resources on the antenna ports used for transmission, where $y^{(p)}(i)$ represents the signal for antenna port p. The PDCCH is transmitted on the same set of antenna ports as the PBCH.

The mapping to resource elements is defined by operations on quadruplets of complex-valued symbols. For example, $z^{(p)}i = \langle y^{(p)}(4i), y^{(p)}(4i+1), y^{(p)}(4i+2), y^{(p)}(4i+3) \rangle$ denotes symbol quadruplet i for antenna port p. The block of quadruplets $z^{(p)}(0), \ldots, z^{(p)}(M_{quad}-1)$, where $M_{quad}=M_{symb}/4$, is permuted resulting in $w^{(p)}(0), \ldots, w^{(p)}(M_{quad}-1)$. The permutation includes the following exceptions:

the input and output to the interleaver is defined by symbol quadruplets instead of bits;

interleaving is performed on symbol quadruplets instead of bits by substituting the terms "bit", "bits" and "bit sequence" by "symbol quadruplet", "symbol quadruplets" and "symbol-quadruplet sequence", respectively;

<NULL> elements at the output of the interleaver are removed when forming $w^{(p)}(0), \ldots, w^{(p)}(M_{quad}-1)$. Note that the removal of <NULL> elements does not affect any <NIL> elements inserted in Section 6.8.2.

The block of quadruplets $w^{(p)}(0), \ldots, w^{(p)}(M_{quad}-1)$ are cyclically shifted, resulting in $\overline{w}^{(p)}(0), \ldots, \overline{w}^{(p)}(M_{quad}-1)$ where $\overline{w}^{(p)}(i)=w^{(p)}((i+N_{ID}^{cell}) \bmod M_{quad})$. Mapping of the block of quadruplets $\overline{w}^{(p)}(0), \ldots, \overline{w}^{(p)}(M_{quad}-1)$ is defined in terms of resource-element groups.

Figure 3:
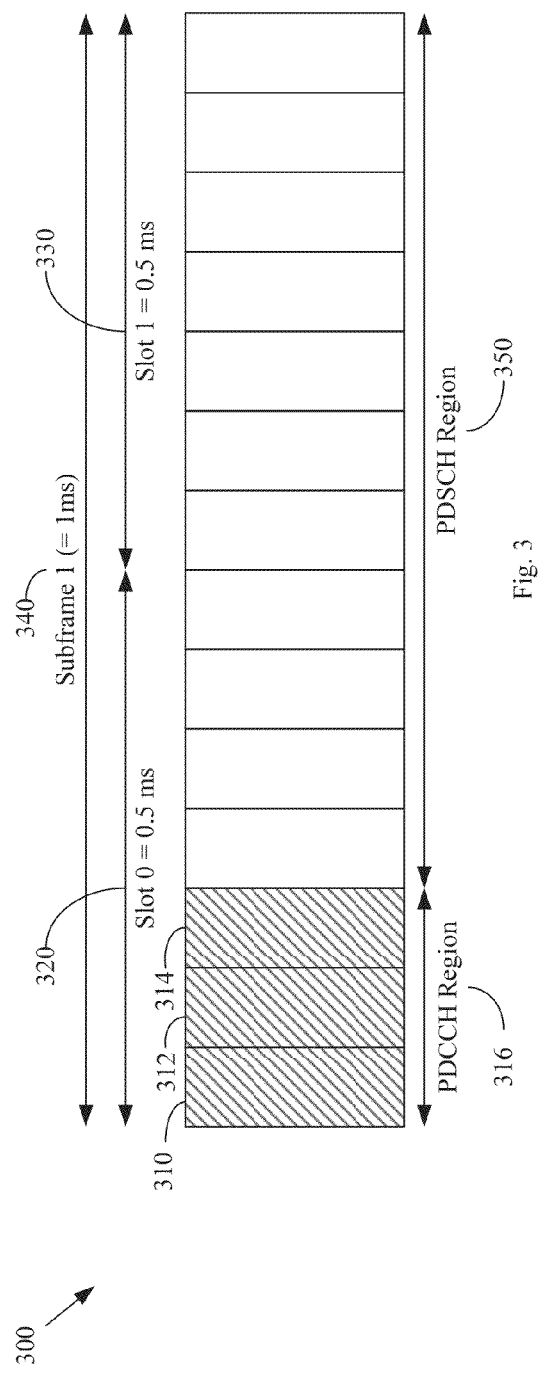
FIG. 3 illustrates PDCCH transmission according to an embodiment.

FIG. 3 illustrates PDCCH transmission 300 according to an embodiment. Three PDCCH OFDM symbols 310, 312, 314 are transmitted from the first to the third OFDM symbols where the number of PDCCH symbols can be determined by PCFICH (Physical Control Format Indicator Channel). For example, in FIG. 3, the PDCCH OFDM symbols 410, 312, 314 are shown in a PDCCH region 316 in slot 0 320. Slot 0 320 and slot 1 330 form subframe 1 340. In FIG. 3, a PDSCH region 350 is shown that may use symbols from slot 0 320 and slot 1 330.

A PDSCH can be scheduled by the DCI (Downlink Control Information) in PDCCH. The PDCCH demodulation is based on CRS (Cell-specific Reference Signal) and PDSCH demodulation can be based on either CRS or UE specific RS. The PDCCH and PDSCH are transmitted in TDM (Time Division Multiplexing) manner so that a UE can first detect PDCCH to get scheduling information and later demodulate PDSCH to obtain data information. To get frequency diversity gain, the PDCCH is scattered to entire bandwidth by CCE-to-RE mapping procedure. The PDCCH mapping for CCE-to-RE mapping from each cell is based on PCI (Physical Cell ID) to offer inter-cell interference randomization. Since the PDCCH physical mapping is designed for inter-cell interference randomization, i.e., not avoidance, some physical REs from multiple cells may collide each other. This effect would become more severe in HetNet (Heterogeneous Network) scenario, e.g., macro-pica cells, and therefore the inter-cell interference coordination for PDCCH is almost impossible. This is one motivation to introduce new PDCCH (i.e. ePDCCH) in Rel-11 to make frequency domain eiCIC (enhanced inter-cell interference coordination) possible via frequency dependent scheduling.

Figure 4:
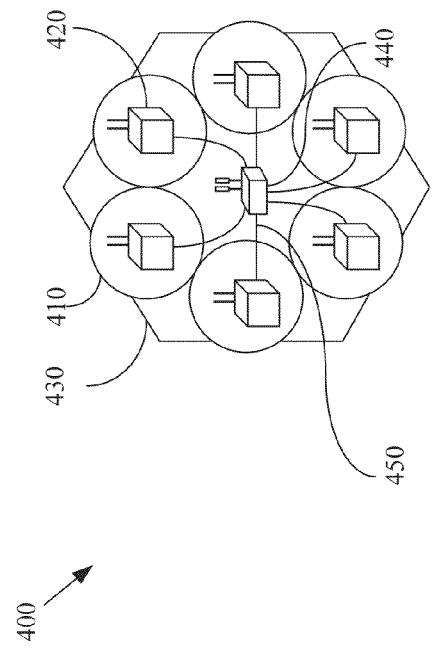
FIG. 4 illustrates a network with low power remote radio heads (RRHs) within the macrocell coverage according to an embodiment.

FIG. 4 illustrates a network with low power remote radio heads (RRHs) within the macrocell coverage 400 according to an embodiment. In a heterogeneous network with low power RRHs within the macrocell coverage, such as CoMP scenario 4, transmission/reception points 410 created by the RRHs 420 have the same cell IDs as the macro cell 430. An eNB 440 may be coupled to the RRHs 420 via optical fiber 450. Since the same physical Cell ID is used for several RRHs 420, the capacity for CRS based PDCCH could be an issue. This is mainly due to the CRS is transmitted from the RRHs 420 as well as from macro cells 430 in a synchronous or quasi-synchronous manner.

Figure 5:
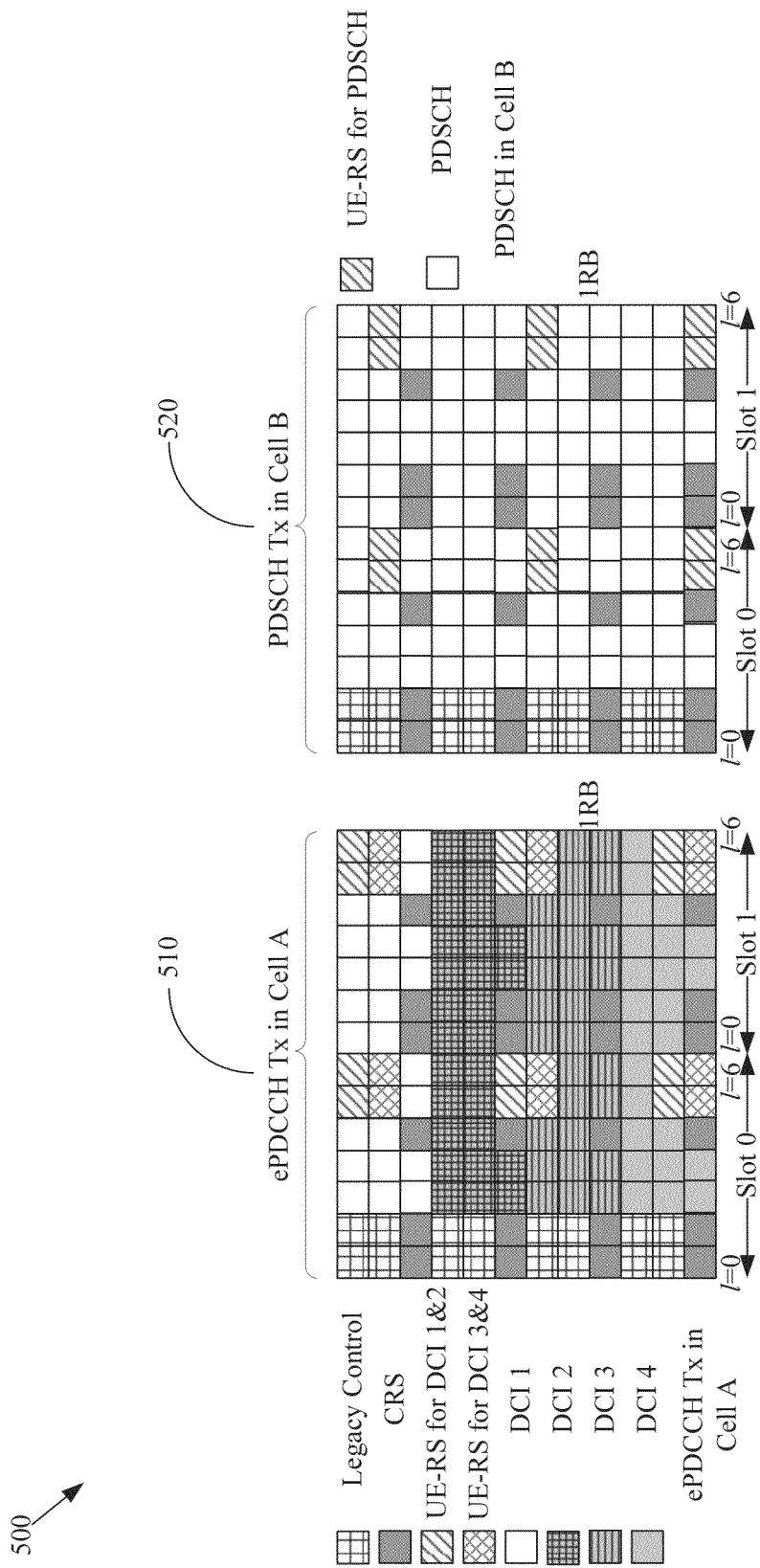
FIG. 5 illustrates an enhanced physical downlink control channel (ePDCCH) that enables frequency domain scheduling according to an embodiment. CCE and REG associated with the ePDCCH are referred to as eCCE and eREG, respectively.

FIG. 5 illustrates resource blocks 500 according to an embodiment. A first resource block is associated with enhanced physical downlink control channel (ePDCCH) transmissions in Cell A 510. A second resource block is associated with physical downlink shared channel transmissions in Cell B 520. The ePDCCH CCE and REG associated with the ePDCCH are referred to as eCCE and eREG, respectively.

Figure 6:
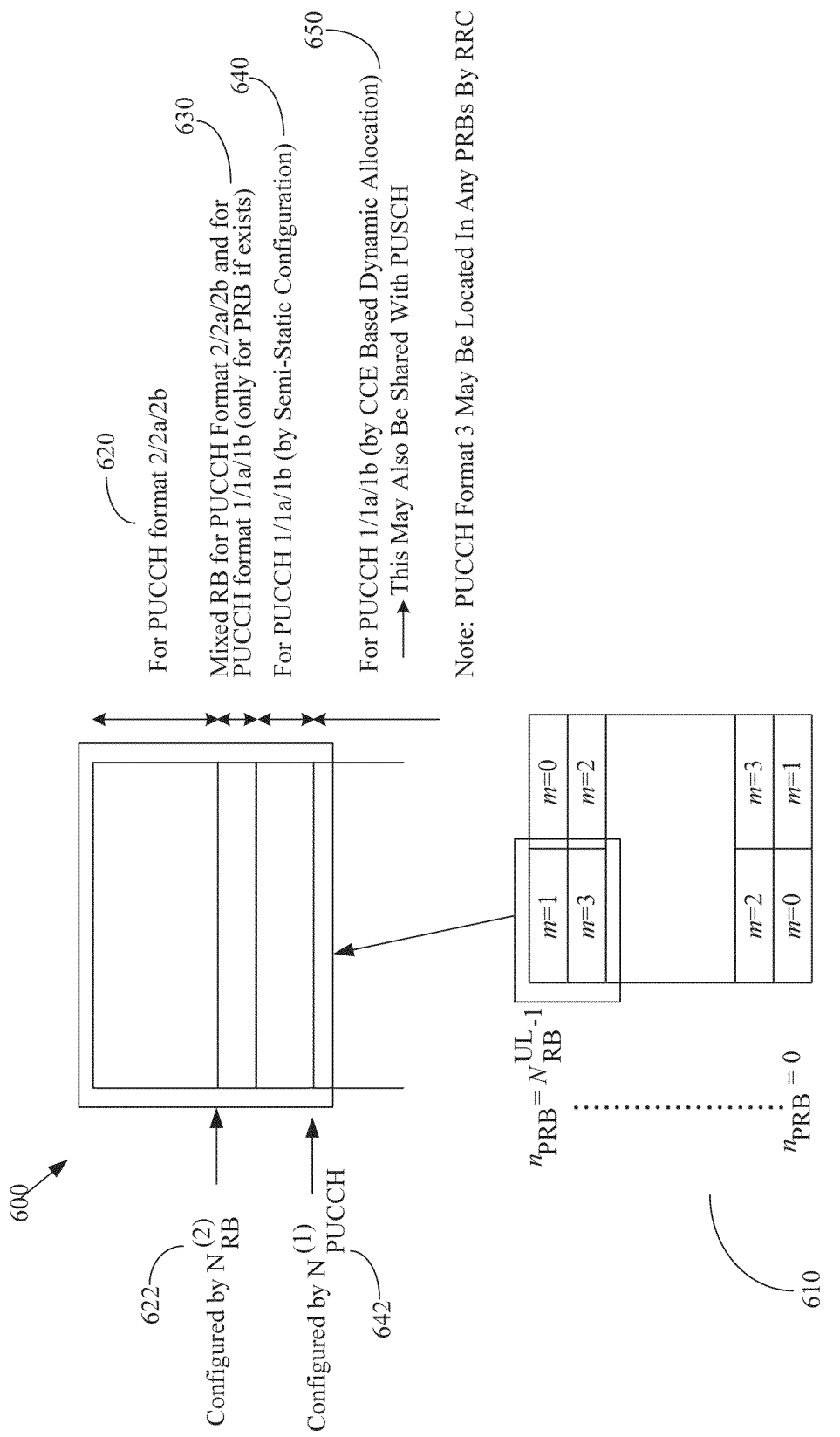
FIG. 6 illustrates PUCCH resource usage according to an embodiment.

FIG. 6 illustrates PUCCH resource usage 600 according to an embodiment. It is noted that the first slot only is elaborated since the second slot is symmetry by slot-level hopping for PUCCH. The PRBs 610 for PUCCH format 2/2a/2b 620 can be located from band-edge PRB to $N_{RB}^{(2)}$ 622 configured by higher layer signaling. If mixed PRB for PUCCH format 2/2a/2b 630 and PUCCH format 1/1a/1b exists configured by $N_{cs}^{(1)}$, only one PRB is available. Following mixed RB 630, the PRBs for PUCCH format 1/1a/1b semi-statically configured by radio resource control (RRC) 640 can be located. Starting from $N_{PUCCH}^{(1)}$ 642, the PRBs for PUCCH format 1a/1b by lowest CCE index based dynamic resource allocation 650 can exist. It is noted that the PUSCH can be also transmitted in dynamic PUCCH resource region according to scheduling policies. Any PRBs can be located for PUCCH format 3 by RRC, but typically it is also likely to be transmitted in sides of band like other PUCCH formats.

The simplest way for PUCCH resource allocation in HARQ-ACK transmission would to configure PUCCH resources for the UEs. However, this would result in a lot of overhead by reserving many PUCCH resources for many UEs. For example, although some UEs can be scheduled on other DL subframes than a subframe A, the PUCCH resources for those UEs should be reserved in unused statuses on the subframe A. This is a main motivation for dynamic resource allocation using CCE-based approach.

For simplicity of explanation, a single carrier is assumed to be configured, i.e., no carrier aggregation. For FDD with PUCCH format 1a/1b, the PUCCH resource to be used for HARQ-ACK transmission is determined by $n_{PUCCH}^{(1,\tilde{p}0)}=nCCE+N_{PUCCH}^{(1)}$ and $n_{PUCCH}^{(1,\tilde{p}1)}=nCCE+1+N_{PUCCH}^{(1)}$, for antenna port 0 and 1 (if TxD for PUCCH format 1a/1b is configured), respectively. In other words, the PUCCH resource is decided by a function of lowest CCE index of PDCCH both for PDSCH scheduling and for SPS-release. Since the PDCCHs for multiple UEs are exclusive, the PUCCH resource for dynamic allocation is automatically decided.

For TDD, with HARQ-ACK multiplexing (PUCCH format 1b based channel selection) with M=1, the PUCCH resources to be used for HARQ-ACK transmission is determined.

For TDD HARQ-ACK bundling or TDD HARQ-ACK multiplexing for one configured serving cell and a subframe n with M=1 where M is the number of elements in the set K, the UE uses PUCCH resource $n_{PUCCH}^{(1,\tilde{p}1)}$ for transmission of HARQ-ACK in subframe n for $\tilde{p}$ mapped to antenna port p for PUCCH format 1b.

If there is PDSCH transmission indicated by the detection of corresponding PDCCH or there is PDCCH indicating downlink SPS release within subframe(s) n−k, where k ∈ K and K is a set of M elements $\{k_0, k_1, \ldots, k_{M-1}\}$ depending on the subframe n and the UL-DL configuration, the UE first selects a c value out of $\{0, 1, 2, 3\}$ which makes $N_c \leq n_{CCE} < N_{c+1}$ and uses resource $n_{PUCCH}^{(1,\tilde{p}1)}=(M-m-1) \cdot N_c + m \cdot N_{c+1} + n_{CCE} + N_{PUCCH}^{(1)}$ for antenna port p0, where $N_{PUCCH}^{(1)}$ is configured by higher layers, Nc=max {0, $\lfloor[N_{RB}^{DL}\cdot(N_{sc}^{RB}\cdot c-4)]/36\rfloor$}, and $n_{CCE}$ is the number of the first CCE used for transmission of the corresponding PDCCH in subframe $n_{k_m}$ and the corresponding m, where km is the smallest value in set K such that UE detects a PDCCH in subframe $n_{k_m}$. When two antenna port transmission is configured for PUCCH format 1a/1b, the PUCCH resource for HARQ-ACK bundling for antenna port p1 is given by $n_{PUCCH}^{(1,\tilde{p}1)}=(M-m-1)\cdot N_c+m\cdot N_{c+1}+n_{CCE}+1+N_{PUCCH}^{(1)}$.

Figure 7:
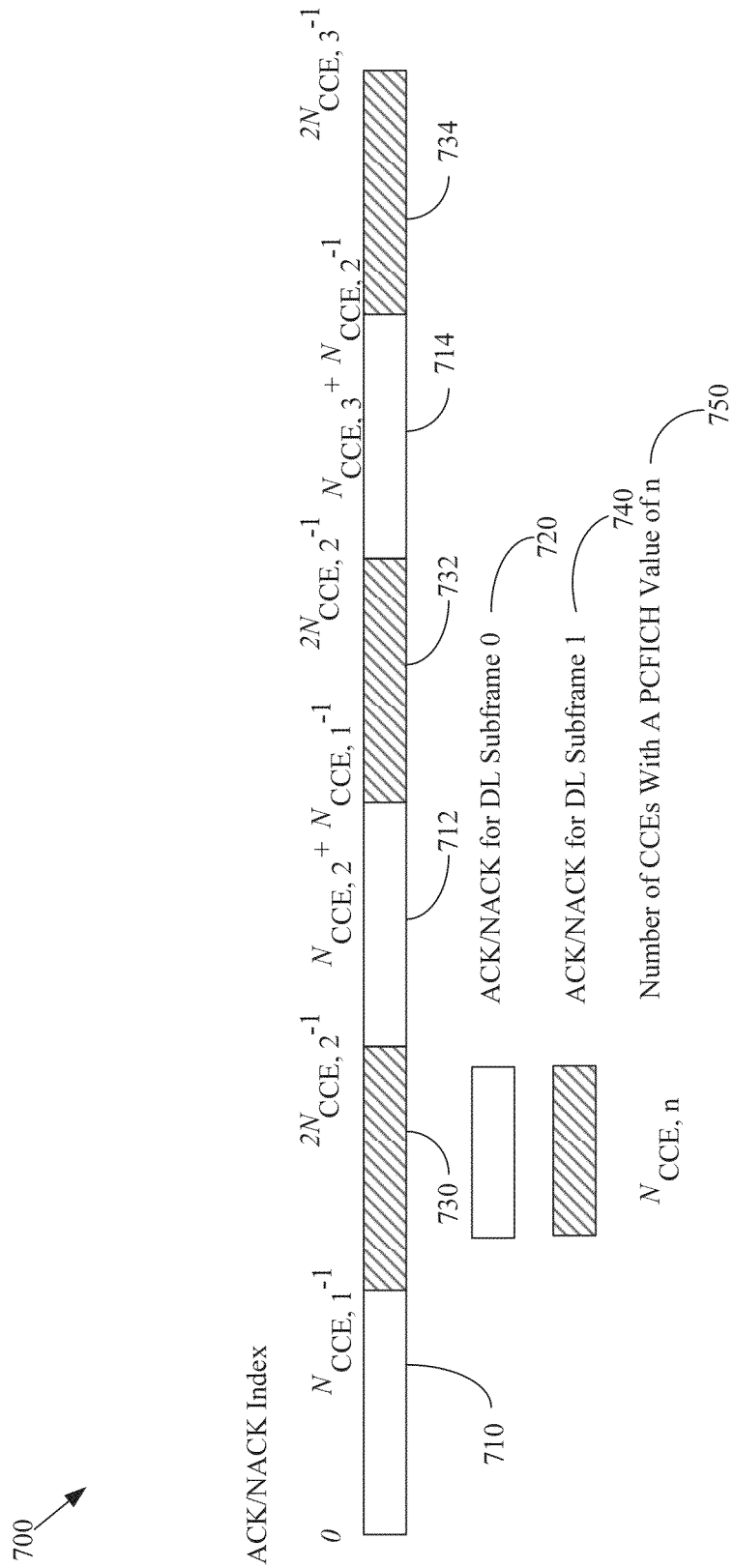
FIG. 7 illustrates block-interleaved mapping for PUCCH resource (HARQ) in TDD according to an embodiment.

FIG. 7 illustrates block-interleaved mapping for PUCCH resource (HARQ) in TDD 700 according to an embodiment. For TDD, the PUCCH resources for each DL subframe are reserved, as much as possible, and the number of reserved resources for each DL subframe are similar to each other by applying block interleaved mapping as seen in FIG. 7. In FIG. 7, three ACK/NACK indices 710, 712, 714 are shown for downlink subframe 0 720. Three ACK/NACK indices 730, 732, 734 are shown for downlink subframe 0 740. In addition, the number of CCEs with a PCFICH value of n 750 are shown.

PUSCH resource thus may be efficiently scheduled for DL subframes within a bundling window. At any case, the PUCCH resource for HARQ-ACK in TDD is also determined by a function of the lowest CCE index of scheduling PDCCH. FDD PUCCH format 1b with channel selection in CA (carrier aggregation) or TDD PUCCH format 1b with channel selection with M=1 in CA is another example that uses n_CCE+1.

The UE determines the PUCCH resources, $n_{PUCCH,j}^{(1)}$ associated with HARQ-ACKU, where 0≤j≤A−1, according to:

for a PDSCH transmission indicated by the detection of a corresponding PDCCH in sub frame n−4 on the primary cell, or for a PDCCH indicating downlink SPS release in subframe n−4 on the primary cell, the PUCCH resource is $n_{PUCCH,j}^{(1)}=n_{CCE}+N_{PUCCH}^{(1)}$, where $n_{CCE}$ is the number of the first CCE used for transmission of the corresponding PDCCH and $N_{PUCCH}^{(1)}$ is configured by higher layers.

for a PDSCH transmission on the primary cell where there is not a corresponding PDCCH detected in subframe n−4, the value of $n_{PUCCH,j}^{(1)}$ is determined according to higher layer configuration. For, j transmission mode that supports up to two transport blocks, the PUCCH resource $n_{PUCCH,j+1}^{(1)}$ is given by $n_{PUCCH,j+1}^{(1)}=n_{PUCCH,j}^{(1)}+1$ for a PDSCH transmission indicated by the detection of a corresponding PDCCH in sub frame n−4 on the secondary cell, the value of $n_{PUCCH,j}^{(1)}$, and the value of $n_{PUCCH,j+1}^{(1)}$ for the transmission mode that supports up to two transport blocks is determined according to higher layer configuration. The TPC field in the DCI format of the corresponding PDCCH is used to determine the PUCCH resource values from one of the four resource values configured by higher layers, with the mapping. For a UE configured for a transmission mode that supports up to two transport blocks a PUCCH resource value maps to two PUCCH resources ($n_{PUCCH,j}^{(1)}$, $n_{PUCCH,j+1}^{(1)}$), otherwise, the PUCCH resource value maps to a single PUCCH resource $n_{PUCCH,j}^{(1)}$.

According to an embodiment, eCCE based implicit resource allocation for ePDCCH may be achieved while co-existing with legacy CCE based implicit resource allocation.

For the FDD UE configured by PUCCH transmit diversity, the resources for antenna port 0 and 1 are determined by $n_{PUCCH}^{(1,\tilde{p}0)}=n_{eCCE}+N_{PUCCH}^{(1)}$ and $n_{PUCCH}^{(1,\tilde{p}1)}=n_{eCCE}+1+N_{PUCCH}^{(1)}$, respectively. For the TDD UE configured by PUCCH transmit diversity as for channel selection (HARQ-ACK multiplexing) with M=1, the second resource for the second antenna port can be determined by means of "+1". That is, the resources for antenna port 0 and 1 are determined by $n_{PUCCH}^{(1,\tilde{p}0)}=(M-m-1)\cdot N_c+m\cdot N_{c+1}+n_{CCE}+1+N_{PUCCH}^{(0)}$ and $n_{PUCCH}^{(1,\tilde{p}1)}=(M-m-1)\cdot N_c+m\cdot N_{c+1}+n_{CCE}+1+N_{PUCCH}^{(1)}$, respectively.

The simplest way for dynamic resource allocation of ePDCCH is to follow the same CCE based principle sharing the same principles. That is, $n_{PUCCH}^{(1,\tilde{p}0)}=n_{eCCE}+N_{PUCCH}^{(1)}$ and $n_{PUCCH}^{(1,\tilde{p}1)}=n_{eCCE}+N_{PUCCH}^{(1)}$ where $n_{eCCE}$ is the lowest CCE index of ePDCCH. However, in case that the UE#0 scheduled by legacy PDCCH and UE#1 scheduled by ePDCCH have the same lowest CCE/eCCE indices, the resulting PUCCH resource indices also become same.

Figure 8:
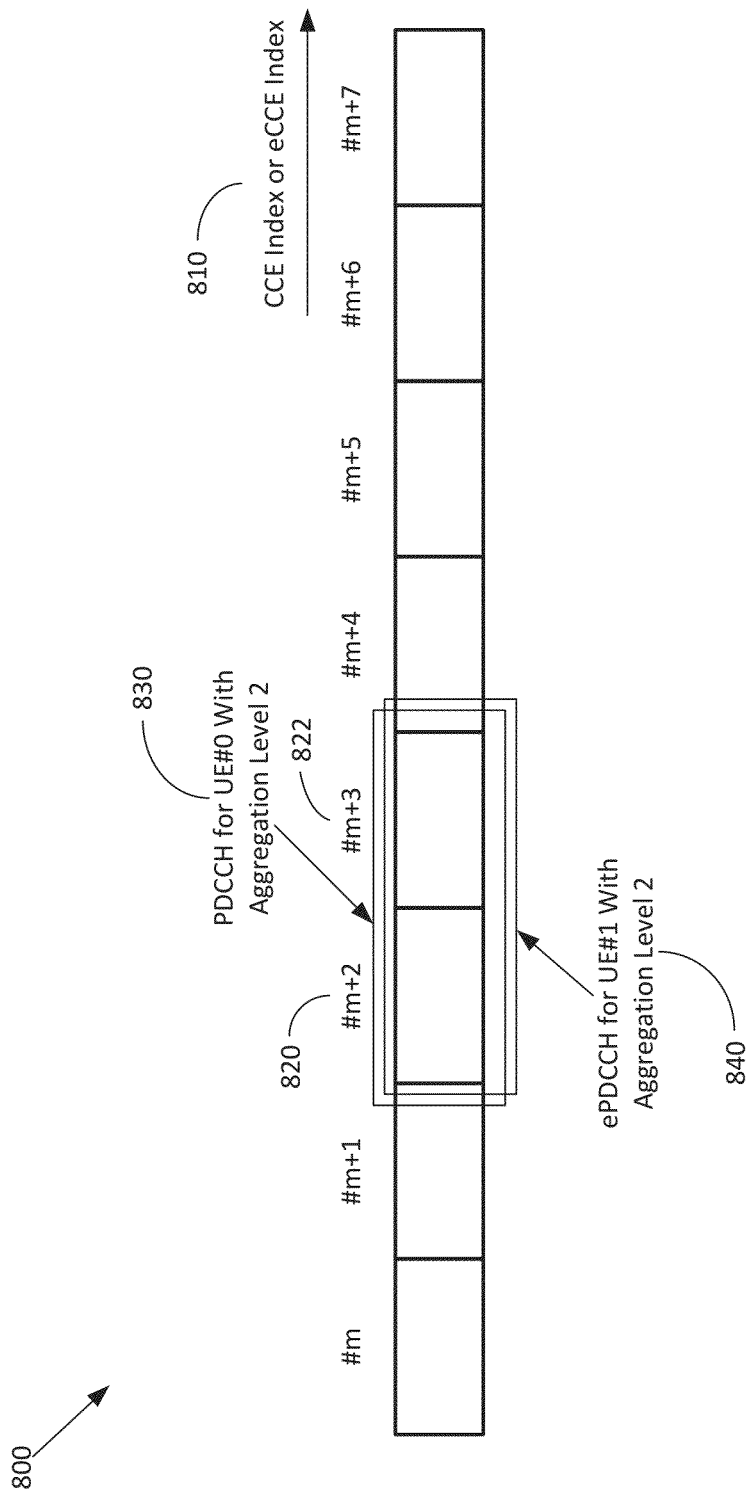
FIG. 8 illustrates Example of PUCCH resource collision due to legacy PDCCH and ePDCCH according to an embodiment.

FIG. 8 illustrates example of PUCCH resource collision 800 due to legacy PDCCH and ePDCCH. As shown in FIG. 8, the CCE or eCCE indices 810 are shown. Indices #m+2 820 and #m+3 822 are associated with PDCCH with aggregation level 2 for UE#0 830. However, indices #m+2 820 and #m+3 822 are also associated with PDCCH with aggregation level 2 for UE#1 840. Two UEs, e.g., UE#0 830 and UE#1 840 thus have the same lowest CCE (eCCE) index, which results in the use of the same PUCCH resources. This problem can be solved by introducing offset value in inducing PUCCH resources. Denote the offset value as $n_{offset}$, then PUCCH resource for HARQ-ACK due to ePDCCH can be determined.

For FDD:
$n_{PUCCH}^{(1,\tilde{p}0)}=n_{eCCE}+N_{PUCCH}^{(1)}+n_{offset}$ for antenna port 0,
$n_{PUCCH}^{(1,\tilde{p}1)}=n_{eCCE}+N_{PUCCH}^{(1)}+n_{offset}$ for antenna port 1.
For TDD:
$n_{PUCCH}^{(1,\tilde{p}0)}=(M-m-1)\cdot N_c+m\cdot N_{c+1}+n_{CCE}+N_{PUCCH}^{(1)}+n_{offset}$ for antenna port 0,
$n_{PUCCH}^{(1,\tilde{p}1)}=(M-m-1)\cdot N_c+m\cdot N_{c+1}+n_{CCE}+N_{PUCCH}^{(1)}+n_{offset}$ for antenna port 1.

The offset value $n_{offset}$ can be given via DCI. It can be x-bits and naturally more x-bits can provide more degree of freedom to avoid the collisions. Alternatively, the offset value $n_{offset}$ can be an antenna specific offset associated with antenna port p, where p is the antenna port allocated to the first CCE of corresponding ePDCCH. For distributed ePDCCH, $k_p=0$, p=107, 109 and for localized ePDCCH, $k_p=p-107$, p∈{107, 108, 109, 110}. In this case, it can be $n_{offset}=2\cdot m\cdot k_p$ (where m is integer). If m=1, $n_{offset}=2\cdot k_p$. Another expression with antenna specific offset is as follows:
For FDD:
$n_{PUCCH}^{(1,\tilde{p}0)}=n_{eCCE}+N_{PUCCH}^{(1)}+k_p$ for antenna port 0,
$n_{PUCCH}^{(1,\tilde{p}1)}=n_{eCCE}+N_{PUCCH}^{(1)}+k_p$ for antenna port 1.
For TDD:
$n_{PUCCH}^{(1,\tilde{p}0)}=(M-m-1)\cdot N_c+m\cdot N_{c+1}+n_{CCE}+N_{PUCCH}^{(1)}+k_p$ for antenna port 0,
$n_{PUCCH}^{(1,\tilde{p}1)}=(M-m-1)\cdot N_c+m\cdot N_{c+1}+n_{CCE}+N_{PUCCH}^{(1)}+k_p$ for antenna port 1.

where kP can be an antenna specific offset associated with antenna port p, where p is the antenna port allocated to the first CCE of corresponding ePDCCH. For distributed ePDCCH, kP=0, p=107, 109 and for localized ePDCCH, kP=2·(p−107), p ∈ {107, 108, 109, 110}.

Note that new RRC configuration $N_{PUCCH,ePDCCH}^{(1)}$ to indicate the starting offset for dynamic resource allocation can be also introduced. In this case, this value can replace $N_{PUCCH}^{(1)}$ in the above equations.

In other words, two PUCCH resources for SORTD are decided by two consecutive PUCCH resources and the first one is determined by the lowest CCE index. Considering the scheduling impact together with SORTD (Spatial Orthogonal Resource Transmit Diversity; PUCCH transmit diversity), it is desirable to define the offset values as even numbers, e.g., −4, −2, 0, 2, 4, . . . ) so that the scheduler can consider two resources for two antenna ports to avoid the collisions. For example, in FIG. 8, if noffset=−1, the resource for the second antenna port of UE#1 corresponding to ePDCCH is colliding with the resource for the first antenna port of UE#0 corresponding to legacy PDCCH. In addition, including '0' for the offset value is also desirable considering the future migration to make the same equation for ePDCCH as the legacy one.

For instance, assuming the number of bit field for offset value in DCI is two, possible offset values can be provided as follows (assuming '0' should be included).

TABLE 3

| DCI contents for offset (bit representation) | $n_{offset}$ |
|---|---|
| 00 | 0 |
| 01 | 2 |
| 10 | 4 |
| 11 | 6 |

Note that the different mapping between bit representation and $n_{offset}$ is also possible.

TABLE 4

| DCI contents for offset (bit representation) | $n_{offset}$ |
|---|---|
| 00 | −2 |
| 01 | 0 |
| 10 | 2 |
| 11 | 4 |

TABLE 5

| DCI contents for offset (bit representation) | $n_{offset}$ |
|---|---|
| 00 | −4 |
| 01 | −2 |
| 10 | 0 |
| 11 | 2 |

Note that the minus value of offset is beneficial in case the aggregation level for previous PDCCHs is large. For example, when the aggregation level is 8 for previous PDCCHs, then the PUCCH resources corresponding to n_CCE+2, n_CCE+3, n_CCE+4, n_CCE+5, n_CCE+6, n_CCE+7 are automatically reserved.

In FIG. 8, the exemplary indices include a lowest index #m, and then sequentially increasing indices #m+1, #m+2 . . . #m+7. As described above, the lowest CCE index of a PDCCH transmission may be the same as the lowest eCCE index of an ePDCCH transmission. For example, the lowest CCE index and the lowest eCCE index may be the same, for example both using index #m+2. If the PUCCH of a first UE and the ePDCCH transmissions of a second UE were scheduled using the CCE/eCCE index #m+2, the transmissions of PUCCHs may conflict due to using the same PUCCH resource indices.

However, a conflicting transmission may be avoided if an offset value is used for dynamic resource allocation of uplink resources using an eCCE. In some embodiments the offset values may be configured by a radio resource control (RRC) entity of the network. However other entities may configure the offset values in other embodiments.

TABLE 6

| DCI contents for offset (bit representation) | $n_{offset}$ |
|---|---|
| 00 | −6 |
| 01 | −4 |
| 10 | −2 |
| 11 | 0 |

TABLE 7

| DCI contents for offset (bit representation) | $n_{offset}$ |
|---|---|
| 00 | 0 |
| 01 | 2 |
| 10 | 6 |
| 11 | 8 |

In another embodiment, if the most of UEs are not configured by SORTD, the offset distance 1 would be more efficient. In this case, the predetermined x sets can be configured by RRC as the network wishes to use. For example of x=2, two sets may be determined as:

Set A: {−2, −1, 0, 1}

Set B: {−4, −2, 0, 2}

The network can configure one of above two sets depending on the usage of SORTD for the UEs. Alternatively, letting the base set as {−2, −1, 0, 1}, the scaling factor can be configured by eNB. For example, if eNB configures scaling factor of 2, then used set becomes {−4, −2, 0, 2} (=2*{−2, −1, 0, 1}). Other examples for one bit representation can be considered as follows:

TABLE 8

| DCI contents for offset (bit representation) | $n_{offset}$ |
|---|---|
| 0 | −2 |
| 1 | 0 |

TABLE 9

| DCI contents for offset (bit representation) | $n_{offset}$ |
|---|---|
| 0 | 0 |
| 1 | 2 |

The DCI bits for the offset can be defined by adding some bits on other DCI or by reusing existing field like TPC/CIF etc. As a hybrid of even number and odd number, the following can be other examples;

TABLE 10

| DCI contents for offset (bit representation) | $n_{offset}$ |
|---|---|
| 00 | −4 |
| 01 | −2 |
| 10 | 0 |
| 11 | 1 |

TABLE 11

| DCI contents for offset (bit representation) | $n_{offset}$ |
|---|---|
| 00 | −2 |
| 01 | 0 |
| 10 | 1 |
| 11 | 2 |

TABLE 12

| DCI contents for offset (bit representation) | $n_{offset}$ |
|---|---|
| 00 | −2 |
| 01 | −1 |
| 10 | 0 |
| 11 | 2 |

In case that ePDCCH is used in stand-alone NCT (New Carrier Type) which can be a PCell, one of the following methods can be used. The offset field can be maintained considering possible future extension like DL MU-MIMO or CoMP. The offset field can be removed since there is no need to keep it, i.e., offset may be 0. The offset field may also be maintained but the value may be set to the predetermined value like 0. This predetermined value can be used as virtual CRC.

The Lowest eCCE index of the corresponding ePDCCH is a component of PUCCH resource determination. A UE is configured with a semi-static PUCCH resource starting offset for each ePDCCH set. eCCE is indexed per ePDCCH set. Dynamically signaled PUCCH resource offset by ePDCCH may or may not be used. Whichever of options A and B is chosen, RRC signaling will not be introduced.

For localized ePDCCH, the antenna port index may not be used. Alternatively, the antenna port index of ePDCCH may be used. Still further, the antenna port index of PDSCH may be used.

There are inherently three cases of PUCCH resource collisions with lowest eCCE based resource allocation. A first case involves a collision between different UEs for MU-MIMO having the same lowest eCCE indices. A second case involves a collision between different UEs with different ePDCCH sets having the same lowest eCCE indices. A third case involves a collision between different UEs by legacy PDCCH and ePDCCH having the same lowest eCCE indices.

The second case results from the fact that a local eCCE index is used rather than global eCCE index. Therefore, the PUCCH resources could collide depending on the UE specific PUCCH starting offset values for each ePDCCH set. The UE specific starting offset may not resolve the third case either because the starting point of PUCCH resource for ePDCCH needs to be orthogonally separated from the PUCCH resource by legacy PDCCH. Relying on the UE specific parameters to solve the collision may not be a good approach because the scheduling restriction is used and it would increase blocking probability for legacy PDCCH and ePDCCH due to limited UE search space for a UE or it needs a large number of UE specific starting offset parameters.

These potential resource collision issues are addressed herein below. One method is to avoid the collision using ARI (A/N Resource Indicator) offset dynamically signaled by PDCCH. A second method is to avoid the collision using AP (Antenna Port) offset for DM RS.

ARI based solution can address the above collision issues by dynamically controlling offset value from DCI both for localized and distributed ePDCCH transmissions. However, it requires at least additional two bit field in DCI to indicate the offset value.

On the other hand, AP based solution can address the first case only in localized ePDCCH transmission. In distributed ePDCCH transmission, AP based solution may not applicable. The proper values of UE specific starting offset per ePDCCH set and the proper scheduling restriction are used to resolve the second and third case.

However, as discussed before, it could cause blocking probability unless the large amount of PUCCH resources are orthogonally distinguished which will eventually converge into global eCCE index definition.

There will be another issue considering the existing resource allocation for PUCCH format 1a/1b TxD (SORTD) and for PUCCH format 1b with channel selection of FDD carrier aggregation. For PUCCH format 1a/1b TxD, the PUCCH resource for the second antenna port $N_{PUCCH}^{(1,\tilde{p}_1)}$ is determined by the next PUCCH resource to the lowest eCCE index, i.e., $n_{eCCE}$. For PUCCH format 1b with channel selection of FDD CA, the additional PUCCH resource $n_{PUCCH,j+1}^{(1)}$ is also determined by the next PUCCH resource to the lowest CCE,) index, i.e., $n_{eCCE}$ when primary cell is configured by MIMO or secondary cell is configured by both cross-carrier scheduling and MIMO. Therefore, the offset values both for ARI based and for AP based solutions need to be the even number offset values to consider this aspect. For example, as for ARI based solution, the ARI values can be $\{-2, 0, 2, 4\}$. As for AP based solution, the resultant PUCCH resource can be $n_{PUCCH}^{(1)} = f(n_{eCCE}) + 2 \cdot AP$ where $f(n_{eCCE})$ is a function of $n_{eCCE}$ and AP can be 0, 1, 2, and 3.

One main concern for ARI based solution is that it requires additional two bits in DCI to indicate offset value. The most beneficial use case of ARI based solution would be to avoid the PUCCH resource collision between legacy PDCCH and ePDCCH. On the other hands, AP based solution can address the issues of Case 1 and Case 2 with a proper scheduling restriction and proper value of UE specific starting offset per ePDCCH set.

Therefore, the following solution can be used depending on the used scenarios. A first approach involves an ARI based solution that is used for backward compatible carrier. An AP based solution is used for non-backward compatible carrier, such as NCT (New Carrier Type). For backward compatible carrier, $n_{PUCCH}^{(1)} = f(n_{eCCE}) + ARI + N_{PUCCH,m}^{(1)}$. For NCT, $n_{PUCCH}^{(1)} = f(n_{eCCE}) + 2 \cdot AP$ or $n_{PUCCH}^{(1)} = f(n_{eCCE,m}) + AP + N_{PUCCH,m}^{(1)}$.

A second approach involves a hybrid of an ARI and AP based solution for backward compatible carrier and AP based non-backward compatible carrier. For backward compatible carrier, $n_{PUCCH}^{(1)} = f(n_{eCCE,m}) + ARI + AP + N_{PUCCH,m}^{(1)}$. For NCT, $n_{PUCCH}^{(1)} = f(n_{eCCE,m}) + AP + N_{PUCCH,m}^{(1)}$, where $n_{eCCE,m}$ is the lowest eCCE index for the detected ePDCCH to a UE at ePDCCH set m (m=0, 1, ..., M−1; M is the number of ePDCCH sets to the UE) and $N_{PUCCH,m}^{(1)}$ is the UE specific PUCCH resource starting offset for the detected ePDCCH set m.

Here, NCT can be used for stand-alone carrier or primary cell. By adopting either of Option 1 or Option 2, the concern of additional two bits in DCI by ARI based solution can be addressed by removing ARI based solution in NCT while it can perfectly solve the collision problems both for legacy and new carrier types.

Based on the discussion so far, we would suggest adopting ARI based solution to resolve collision issues because it is a universal solution. As for the function of $f(n_{eCCE})$, we do not see a strong reason to have different form other than $f(n_{eCCE})=n_{eCCE}$.

Embodiments are presented herein below. According to a first embodiment, an ARI based offset is adopted for PUCCH resource allocation both for localized and distributed ePDCCH transmissions by dynamically being indicated by DCI with two bits. For FDD, $n_{PUCCH}^{(1,\tilde{p}0)}=n_{eCCE,s}+ARI+N_{PUCCH,s}^{(1)}$, where $n_{eCCE,s}$ is the lowest eCCE index detected in ePDCCH set s and $N_{PUCCH,s}^{(1)}$ is the UE specific starting offset for ePDCCH set s configured by RRC signaling. ARI is an offset value indicated by detected ePDCCH and is one of the value $\{-2, 0, 2, 4\}$.

As for TDD, current resource allocation doesn't apply PUCCH resource compression, i.e., the PUCCH resource region is reserved for each DL subframe within a bundling window and block interleaving is applied per control format indicator (CFI). Since the current PUCCH resource allocation for TDD considered the number of CCEs per DL OFDM symbol for legacy PDCCH occupying entire bandwidth, the reuse of the exact same equation does not seems appropriate. Given that the eCCE indexing is per each ePDCCH set for both localized and distributed ePDCCH transmissions, CFI level block interleaving can be omitted.

Accordingly, an embodiment for PUCCH resource allocation for TDD is as follows. For TDD HARQ-ACK bundling or TDD HARQ-ACK multiplexing for one configured serving cell and a subframe n with M=1 where M is the number of elements in the set K, the UE shall use PUCCH resource $n_{PUCCH}^{(1,\tilde{p})}$ for transmission of HARQ-ACK in subframe n for $\tilde{p}$ mapped to antenna port p for PUCCH format 1a/1b, where If there is PDSCH transmission indicated by the detection of corresponding PDCCH/ePDCCH or there is PDCCH/ePDCCH indicating downlink SPS release within subframe(s) n−k, where k∈K and K is a set of M elements $\{k_0, k_1, \ldots, k_{M-1}\}$ depending on the subframe n and the UL/DL configuration, and if ePDCCH indicating PDSCH transmission or downlink SPS release is detected in subframe n−$k_m$, where $k_m$ is the smallest value in set k such that UE detects a PDCCH/ePDCCH indicating PDSCH transmission or downlink SPS release within subframe(s) n−k and k ∈K, the UE shall use if ePDCCH-PRB-set q is configured for distributed transmission $$n_{PUCCH}^{(1,\tilde{p}0)}=n_{eCCE,q}+\Sigma_{il=0}^{m-1}N_{eCCE,q,n-k_n}+\Delta_{ARO}+N_{PUCCH,q'}^{(e1)}$$

if ePDCCH-PRB-set q is configured for localized transmission $$n_{PUCCH}^{(1,\tilde{p}0)} = \left\lfloor \frac{n_{eCCE,q}}{N_{RB}^{eCCE,q}} \right\rfloor n_{eCCE,q} + \sum_{il=0}^{m-1} N_{eCCE,q,n-k_n} + n' + \Delta_{ARO} + N_{PUCCH,q'}^{(e1)}$$

for antenna port $p_0$, where $n_{eCCe,q}$ is the number of the first eCCE (i.e. lowest eCCE index used to construct the ePDCCH) used for transmission of the corresponding DCI assignment in ePDCCH-PRB-set q in subframe n−$k_m$ and the corresponding m, $N_{PUCCH,q}^{(e1)}$ for ePDCCH-PRB-set q is configured by a higher layer parameter, e.g., pucch-ResourceStartOffset-r11, $N_{RB}^{eCCE,q}$ for ePDCCH-PRB-set q in subframe n−$k_m$, n' is determined from the antenna port used for ePDCCH transmission in subframe n−$k_m$. If m=0, $\Delta_{ARO}$ is determined from the HARQ-ACK resource offset field in the DCI format of the corresponding ePDCCH. If m>0, $\Delta_{ARO}$ is determined from the HARQ-ACK resource offset field in the DCI format of the corresponding ePDCCH. If the UE is configured to monitor ePDCCH in subframe n−$k_{il}$, $N_{eCCE,q,n-k_{il}}$ is equal to the number of eCCEs in ePDCCH-PRB-set q configured for that UE in subframe n−$k_{il}$. If the UE is not configured to monitor ePDCCH in subframe n−$k_{il}$, $N_{eCCE,q,n-k_{il}}$ is equal to the number of eCCEs computed assuming ePDCCH-PRB-set q is configured for that UE in subframe n−$k_{il}$. For normal downlink CP, if subframe n−$k_{il}$ is a special subframe with special subframe configuration 0 or 5, $N_{eCCE,q,n-k_{il}}$ is equal to 0. For extended downlink CP, if subframe n−$k_{il}$ is a special subframe with special subframe configuration 0 or 4 or 7, $N_{eCCE,q,n-k_{il}}$ is equal to 0. When two antenna port transmission is configured for PUCCH format 1a/1b, the PUCCH resource for HARQ-ACK bundling for antenna port $p_1$ is given by:

if ePDCCH-PRB-set q is configured for distributed transmission $$n_{PUCCH}^{(1,\tilde{p}1)}=n_{eCCE,q}+\Sigma_{il=0}^{m-1}N_{eCCE,q,n-k_{il}}+\Delta_{ARO}+N_{PUCCH,q'}^{(e1)}$$

if ePDCCH-PRB-set q is configured for localized transmission $$n_{PUCCH}^{(1,\tilde{p}1)} = \left\lfloor \frac{n_{eCCE,q}}{N_{RB}^{eCCE,q}} \right\rfloor N_{eCCE,q} + 1 + \sum_{il=0}^{m-1} N_{eCCE,q,n-k_n} + n' + \Delta_{ARO} + N_{PUCCH,q'}^{(e1)}$$

PUCCH resource allocation for UL-CoMP involves a higher layer configuring UE-specific $N_{PUCCH,CoMP}^{(1)}$ to substitute for $N_{PUCCH}^{(1)}$ in PUCCH resource allocation for the PDCCH-triggered dynamic A/N resource of a UE configured with the PUCCH VCID. The UE specific $N_{PUCCH,CoMP}^{(1)}$ may be used by the CoMP UE to avoid the collision with the UE in coordinating cell for the corresponding virtual cell ID and possibly for eiCIC on PUCCH between cells.

According to a third embodiment, when ePDCCH is used in a subframe for a UE and $N_{PUCCH,CoMP}^{(1)}$ is configured for a UE, the UE does not use $N_{PUCCH,CoMP}^{(1)}$ for PUCCH resource allocation. As another solution, the parameter $N_{PUCCH,CoMP}^{(1)}$ can be used together with ePDCCH parameter. For example, for FDD, it can be $n_{PUCCH}^{(1,\tilde{p}0)}=n_{eCCCE,s}+ARI+N_{PUCCH,s}^{(1)}+N_{PUCCH,CoMP}^{(1)}$.

For PUCCH format 3, PUCCH resource allocation in Rel-10 is that SCell-TPC is used to indicate used PUCCH resource among four configured resources. PCell-TPC is not used as indicator but it is used as real TPC. The UE assumes the SCell-TPC values are same. When a UE receives a single PDSCH (for FDD) on primary cell only, PUCCH format 1a/1b is used. This PCell fall-back can be also used for reconfiguration handling. However, since additional two bits are used for ARI in ePDCCH, this ARI can be also used to indicate PUCCH format 3 resource.

According to another embodiment, when ePDCCH is used in a subframe for a UE and PUCCH format 3 is configured for the UE, an ARI offset value is used for indicating used PUCCH resource among four configured resources for PUCCH format 3.

Alternatively, for FDD PUCCH format 3, PUCCH resource allocation involves using SCell-TPC to indicate actual used PUCCH format 3 resource among four configured resource values. PCell-TPC is not used as indicator but it is used as real TPC. A UE assumes that the same HARQ-ACK PUCCH resource value is transmitted in each DCI format of the corresponding secondary cell PDCCH assignments in a given subframe. When a UE receives a single PDSCH or SPS-release on only a primary cell, PUCCH format 1a/1b with dynamic resource allocation may be used. To facilitate fall-back for a UE with ePDCCH, at least for PDSCH or SPS-release on PCell, the corresponding ePDCCH may use an ARI value. For PDSCH on SCell, since SCell-TPC is available for resource allocation of PUCCH format 3, ARI may not be included on the SCell.

For TDD PUCCH format 3, PUCCH resource allocation involves the use of TPCs other than in the subframe having DAI=1 on PCell to indicate actual used PUCCH format 3 resource among four configured resource values. The TPC with DAI=1 is not used as indicator but it is used as real TPC. Because other TPCs on PCell are used to indicate used PUCCH format 3 resource, the accumulative PUCCH power control within a bundling window is not possible. A UE assumes that the same HARQ-ACK PUCCH resource value is transmitted on the PDCCH assignments in the primary cell and in each secondary cell that are used to determine the PUCCH resource value within the subframe(s) n−k, where k ∈K.

When a UE receives a single PDSCH or SPS-release on primary cell only with PDCCH having DAI=1, PUCCH format 1a/1b with dynamic resource allocation is used. When a UE receives a single PDSCH with PDCCH having DAI=1 or SPS-PDSCH on primary cell only, PUCCH format 1b with channel selection is used and the dynamic resource allocation for PDSCH with PDCCH is used. To facilitate fall-back for a UE with ePDCCH, at least for PDSCH or SPS-release with PDCCH having DAI=1 on PCell needs to include ARI value. However, since the UE will not know the DAI value before ePDCCH decoding, ARI also needs to be included for other DAI values on primary cell. In this case, the TPC value on PCell can be used for accumulative PUCCH power control. For PDSCH on SCell, since SCell-TPC is used for resource allocation of PUCCH format 3, there is no need to include ARI for the SCell. However, the SCell may still provide the two zero bits for ARI.

As for PUCCH format 1b with channel selection, dynamic resource allocation, i.e., implicit resource allocation determined by lowest eCCE index, is used for the PDCCHs transmitted on primary cell (including cross-carrier scheduling). Therefore, the ARI field needs to be included for ePDCCH transmitted on primary cell. For other case, no ARI is used (similar to PUCCH format 3).

In another embodiment, when ePDCCH is used in a subframe for a UE, and PUCCH format 3 or PUCCH format 1b with channel selection in CA (carrier aggregation) is configured for the UE, the ARI offset value is included only for the ePDCCHs transmitted on the primary cell.

For TDD, the UE is not expected to receive ePDCCH in a special subframe with special subframe configuration 0 or 5 in normal CP, or special subframe configuration 0, 4, or 7 in extended CP. Also, subframes where UE monitors ePDCCH USS are configured by higher layer signaling. Therefore, within a bundling window, ePDCCH can be transmitted at some DL subframes and legacy PDCCH can be transmitted at other DL subframes in a bundling window. In this case, the implicit resource allocation method is mixed up subframe by subframe. For example, in the DL subframes for ePDCCH a UE uses UE specific starting offset $N_{PUCCH,s}^{(1)}$, and in other DL subframes for legacy PDCCH a UE uses cell specific starting offset $N_{PUCCH}^{(1)}$. Also, depending on the decision for TDD PUCCH resource allocation with ePDCCH, special handling may be used to handle this case. Therefore, for simplicity, it is preferred the same type of downlink control channel is used within a bundling window in TDD.

Another embodiment is provided for TDD. Only one type of ePDCCH and legacy PDCCH is used (but not together) for the DL subframes (including special subframe) within a bundling window in subframe n−km (per serving cell or per serving cells). For TDD, if different types of DL control channels of legacy PDCCH and ePDCCH can co-exist within a bundling window in subframe n−km, $Nn_{PUCCH}^{(1,\tilde{p}_0)}$=value+$n_{eCCE,s}$+ARI+$N_{PUCCH,s}^{(1)}$, where value is a value associated with one or more of the specific sub frame, a signaled value, a physical downlink shared channel, or a semi-persistent scheduling (SPS) value.

Figure 9:
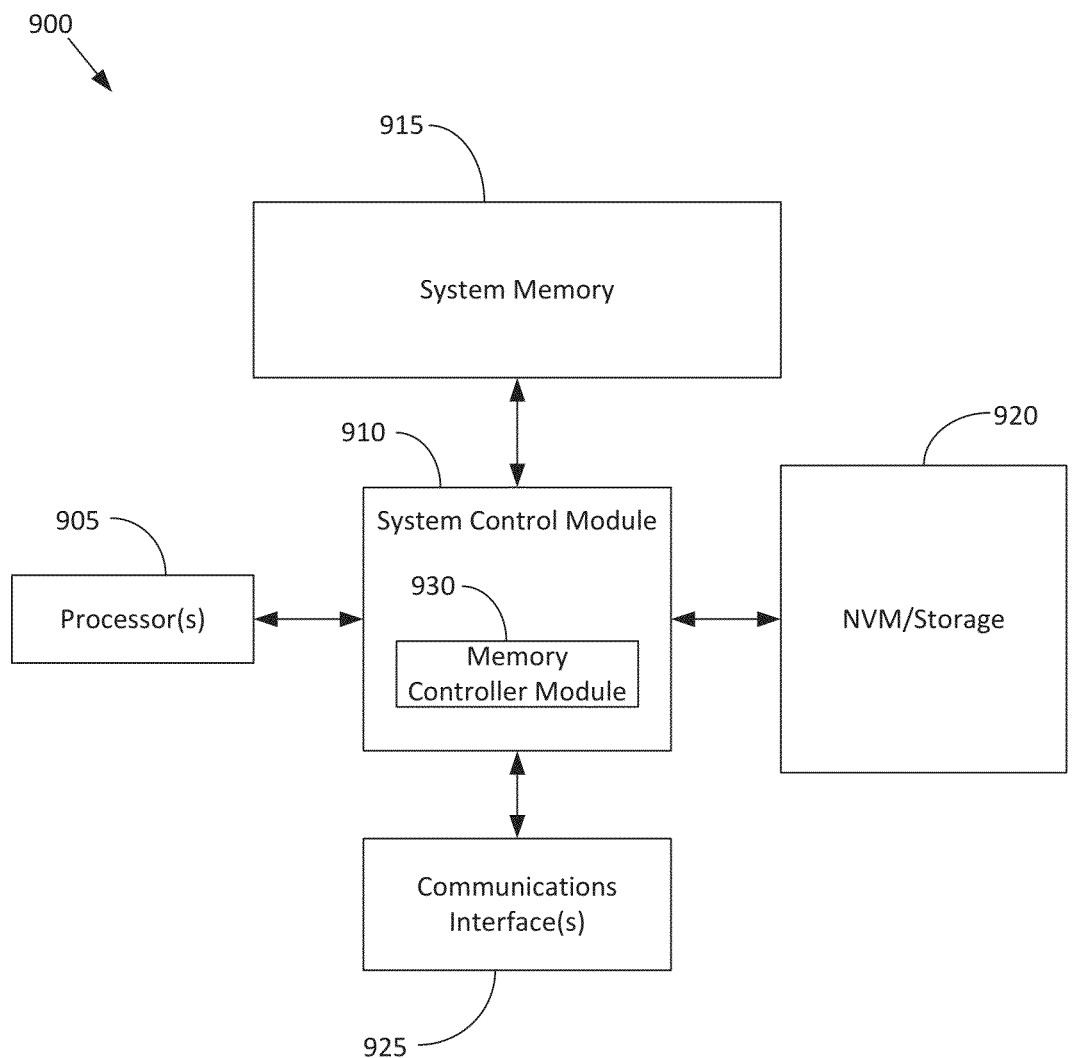
FIG. 9 schematically illustrates an example system that may be used to practice various embodiments described herein.

FIG. 9 schematically illustrates an example system 900 that may be used to practice various embodiments described herein. FIG. 9 illustrates, for one embodiment, an example system 900 having one or more processor(s) 905, system control module 910 coupled to at least one of the processor(s) 905, system memory 915 coupled to system control module 910, non-volatile memory (NVM)/storage 920 coupled to system control module 910, and one or more communications interface(s) 925 coupled to system control module 910.

In some embodiments, the system 900 may be capable of functioning as the UE 110 as described herein. In other embodiments, the system 900 may be capable of functioning as the eNB 95 depicted in the embodiment shown in FIG. 1 or any one of the other described embodiments. In some embodiments, the system 900 may include one or more computer-readable media (e.g., system memory or NVM/storage 920) having instructions and one or more processors (e.g., processor(s) 905) coupled with the one or more computer readable media and configured to execute the instructions to implement a module to perform actions described herein. System control module 910 for one embodiment may include any suitable interface controllers to provide for any suitable interface to at least one of the processor(s) 905 and/or to any suitable device or component in communication with system control module 910.

System control module 910 may include memory controller module 930 to provide an interface to system memory 915. The memory controller module 930 may be a hardware module, a software module, and/or a firmware module.

System memory 915 may be used to load and store data and/or instructions, for example, for system 900. System memory 915 for one embodiment may include any suitable volatile memory, such as suitable DRAM, for example. In some embodiments, the system memory 915 may include double data rate type four synchronous dynamic random-access memory (DDR4 SDRAM). System control module 910 for one embodiment may include one or more input/output (I/O) controller(s) to provide an interface to NVM/storage 920 and communications interface(s) 925.

The NVM/storage 920 may be used to store data and/or instructions, for example. NVM/storage 920 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 920 may include a storage resource physically part of a device on which the system 900 is installed or it may be accessible by, but not necessarily a part of, the device. For example, the NVM/storage 920 may be accessed over a network via the communications interface(s) 925.

Communications interface(s) 925 may provide an interface for system 900 to communicate over one or more network(s) and/or with any other suitable device. The system 900 may wirelessly communicate with the one or more components of the wireless network in accordance with any of one or more wireless network standards and/or protocols.

For one embodiment, at least one of the processor(s) 905 may be packaged together with logic for one or more controller(s) of system control module 910, e.g., memory controller module 930. For one embodiment, at least one of the processor(s) 905 may be packaged together with logic for one or more controllers of system control module 910 to form a System in Package (SiP). For one embodiment, at least one of the processor(s) 905 may be integrated on the same die with logic for one or more controller(s) of system control module 910. For one embodiment, at least one of the processor(s) 905 may be integrated on the same die with logic for one or more controller(s) of system control module 910 to form a System on Chip (SoC).

In various embodiments, the system 900 may be, but is not limited to, a server, a workstation, a desktop computing device, or a mobile computing device (e.g., a laptop computing device, a handheld computing device, a tablet, a netbook, etc.). In various embodiments, the system 900 may have more or less components, and/or different architectures. For example, in some embodiments, the system 900 includes one or more of a camera, a keyboard, liquid crystal display (LCD) screen (including touch screen displays), non-volatile memory port, multiple antennas, graphics chip, application-specific integrated circuit (ASIC), and speakers.

Figure 10:
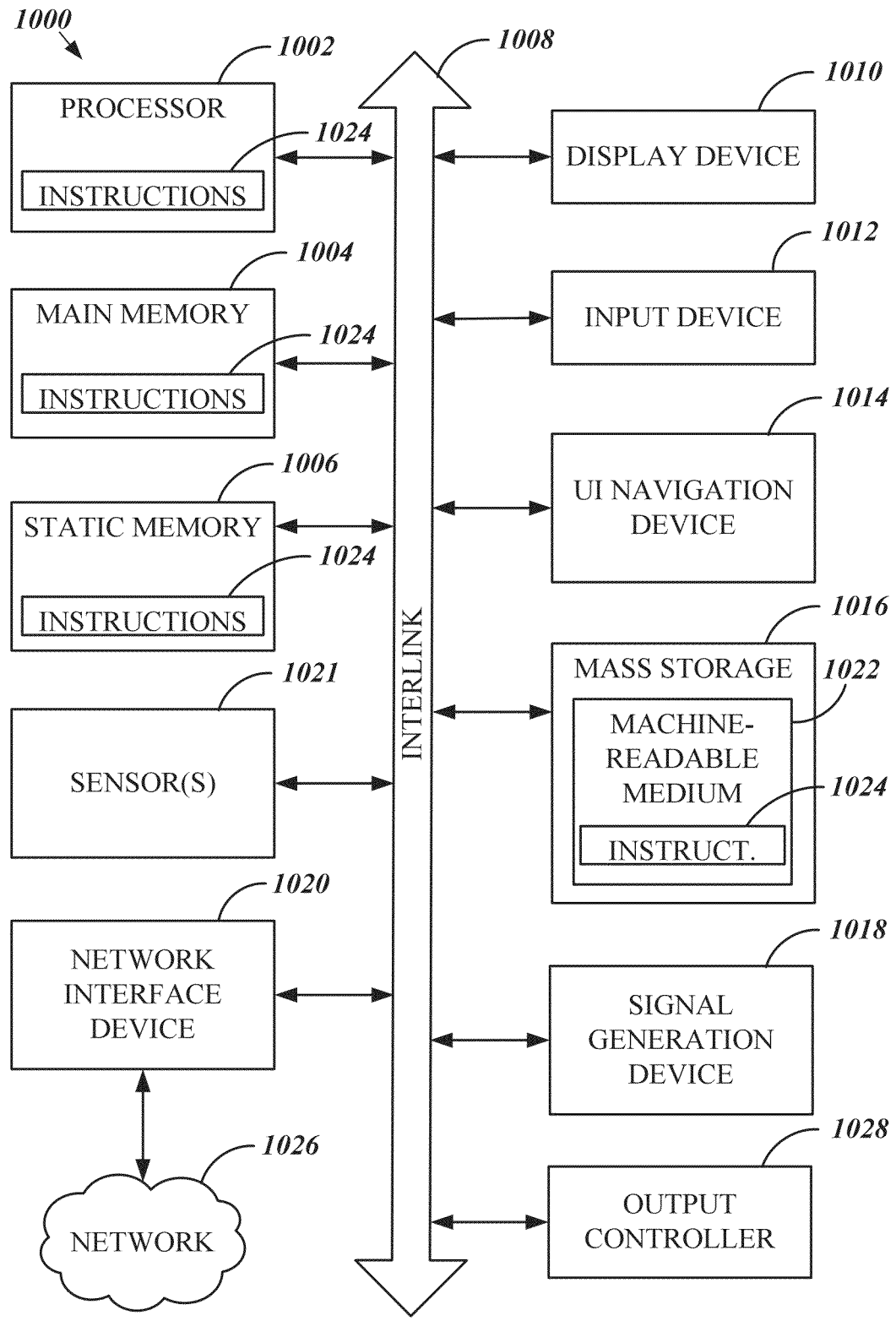
FIG. 10 illustrates a block diagram of an example machine for providing dynamic hybrid automatic repeat request-acknowledgement (HARQ-ACK) transmission with enhanced physical downlink control channels according to an embodiment.

FIG. 10 illustrates a block diagram of an example machine 1000 for providing dynamic hybrid automatic repeat request-acknowledgement (HARQ-ACK) transmission with enhanced physical downlink control channels according to an embodiment upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine and/or a client machine in server-client network environments. In an example, the machine 1000 may act as a peer machine in peer-to-peer (P2P) (or other distributed) network environment. The machine 1000 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1002 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1002 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multi-processor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, at least some of which may communicate with others via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR)) connection to communicate or control one or more peripheral devices (e.g., a printer, card reader, etc.).

The storage device 1016 may include at least one machine readable medium 1022 on which is stored one or more sets of data structures or instructions 1024 (e.g., software) embodying or utilized by any one or more of the techniques or functions described herein. The instructions 1024 may also reside, at least partially, additional machine readable memories such as main memory 1004, static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) that configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1×*standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Additional Notes & in Examples

In Example 1 includes subject matter (such as a device, apparatus, client or system) for a serving node, including a receiver arranged to receive, on an enhanced physical downlink control channel (ePDCCH), one of a lowest control channel element index ($n_{CCE}$) and a lowest enhanced control channel element index ($n_{eCCE}$), a user equipment specific starting offset ($N_{PUCCH}^{(1)}$) and at least one additional offset-related parameter, a processor arranged to determine allocation of an uplink resource of a physical uplink control channel (PUCCH) for Hybrid Automatic Repeat reQuest-ACKnowledgement (HARQ-ACK) transmission based the one of the lowest control channel element index ($n_{CCE}$) and the lowest enhanced control channel element index ($n_{eCCE}$), the user equipment specific starting offset ($N_{PUCCH}^{(1)}$) and at least one selected from the at least one additional offset-related parameter and a transmitter arranged to transmit a signal on the PUCCH using the allocated uplink resource.

In Example 2 the subject matter of Example 1 may optionally include, wherein the at least one additional offset-related parameter comprises at least one selected from an acknowledgement/non-acknowledgement (ACK/NACK) resource offset (ARO) value, an antenna port offset (AP), a maximum number of eCCE indices among the ePDCCH sets to a user equipment in a specified subframe ($N_m$), an offset informed to the user equipment by higher layer signaling to avoid collision with the user equipment in coordinating cells $N_{PUCCH,CoMP}^{(1)}$, and a value associated with one or more of a specific subframe, a signaled value, a physical downlink shared channel, and a semi-persistent scheduling (SPS).

In Example 3 the subject matter of any one or more of Examples 1-2 may optionally include, wherein the receiver further receives a user equipment specific starting offset for a detected ePDCCH set configured by radio resource control (RRC) signaling $N_{PUCCH,m}^{(1)}$.

In Example 4 the subject matter of any one or more of Examples 1-3 may optionally include, wherein the processor is further arranged to determine an ARI-based allocation of an uplink resource of a PUCCH for HARQ-ACK transmission using a backward compatible carrier ($n_{PUCCH}^{(1)}$) is given by $(n_{eCCE})+ARI+N_{PUCCH,m}^{(1)}$, wherein $f(n_{eCCE})$ is a function of the lowest enhanced control channel element index ($n_{eCCE}$).

In Example 5 the subject matter of any one or more of Examples 1-4 may optionally include, wherein the processor is further arranged to determine an AP-based allocation of an uplink resource of a PUCCH for HARQ-ACK transmission for a new carrier type (NCT) is given by one of $f(n_{eCCE})+2 \cdot AP$ or $f(n_{ECCE,m})+AP+N_{PUCCH,m}^{(1)}$, wherein $f(n_{ECCE,m})$ is a function of the lowest eCCE index for the detected ePDCCH to the user equipment at ePDCCH set m, wherein m=0, 1, . . . , M−1 and M is the number of ePDCCH sets to the user equipment.

In Example 6 the subject matter of any one or more of Examples 1-5 may optionally include, wherein the processor is further arranged to determine an hybrid allocation of an uplink resource of a PUCCH for HARQ-ACK transmission using a backward compatible carrier ($n_{PUCCH}^{(1)}$) is given by $f(n_{eCCE,m})+ARI+AP+N_{PUCCH,m}^{(1)}$.

In Example 7 the subject matter of any one or more of Examples 1-6 may optionally include, wherein the processor is further arranged to determine an AP-based allocation of an uplink resource of a PUCCH for HARQ-ACK transmission for a new carrier type (NCT) is given by $f(n_{eCCE,m})+AP+N_{PUCCH,m}^{(1)}$.

In Example 8 the subject matter of any one or more of Examples 1-7 may optionally include, wherein the processor is further arranged to determine allocation of an uplink resource of a physical uplink control channel (PUCCH) for HARQ-ACK bundling for resource allocation for subframe n for an enhanced PDCCH transmission is given by:

$n_{PUCCH}^{(1,\tilde{p}0)} = n_{eCCE,q} + \Sigma_{il=0}^{m-1} N_{eCCE,q,n-k_n} + \Delta_{ARO} + N_{PUCCH,q}^{(e1)}$ if ePDCCH-PRB-set q is configured for distributed transmission, and $$n_{PUCCH}^{(1,\tilde{p}0)} = \left\lfloor \frac{n_{eCCE,q}}{N_{RB}^{eCCE,q}} \right\rfloor n_{eCCE,q} + \sum_{il=0}^{m-1} N_{eCCE,q,n-k_n} + n' + \Delta_{ARO} + N_{PUCCH,q}^{(e1)}$$

if ePDCCH-PRB-set q is configured for localized transmission.

In Example 9 the subject matter of any one or more of Examples 1-8 may optionally include, wherein the processor is further arranged to determine an ARI-based $(n_{eCCE})$+ARI+ $N_{PUCCH,m}^{(1)}$, where allocation of an uplink resource of a PUCCH for HARQ-ACK transmission given by value+ wherein the value is associated with one or more of a specific subframe, a signaled value, a physical downlink shared channel, and a semi-persistent scheduling (SPS), determine, for an enhanced PDCCH used in a subframe and configured for PUCCH format 3, an allocation of an uplink resource of a PUCCH for HARQ-ACK transmission based on the ARI offset value, determine, for an enhanced PDCCH used in a subframe and configured for PUCCH format 3, an allocation of an uplink resource of a PUCCH for HARQ-ACK transmission using transmit power controls (TPCs), other than in a subframe having downlink assignment index (DAI) equal to one on a primary cell, to indicate a used PUCCH format 3 resource among four configured resources, determine, for an enhanced PDCCH used in a subframe and configured for one of a PUCCH format 3 and PUCCH format 1b with channel selection for the user equipment configured for carrier aggregation, an allocation of an uplink resource of a PUCCH for HARQ-ACK transmission that includes the ARI offset value for an enhanced PDCCHs transmitted on a primary cell and determine the allocation of the uplink resource of the PUCCH for HARQ-ACK transmission using a user equipment specific starting offset for enhanced PDCCH set s configured by RRC signaling for a downlink (DL) subframe for enhanced PDCCH and using a cell specific starting offset for enhanced PDCCH set s configured by RRC signaling for DL subframes associated with legacy PDCCH.

In Example 10 the subject matter of any one or more of Examples 1-9 may optionally include, wherein the processor is further arranged to transmit a HARQ-ACK PUCCH resource value on each PDCCH assignment in a primary cell and in each secondary cell to determine the PUCCH resource value within a subframe.

In Example 11 the subject matter of any one or more of Examples 1-10 may optionally include, wherein the receiver is further arranged to receive a single physical downlink shared channel (PDSCH) on a primary cell with the PDCCH having a DAI equal to one, the processor using PUCCH format 1a/1b with dynamic resource allocation for allocation of an uplink resource of a physical uplink control channel (PUCCH) for HARQ-ACK transmission.

In Example 12 the subject matter of any one or more of Examples 1-11 may optionally include, wherein the processor is further arranged to use only one of an enhanced physical downlink control channel and a legacy physical downlink control channel for downlink subframes.

In Example 13 may include subject matter (such as a method or means for performing acts) including receiving, on an enhanced physical downlink control channel (ePDCCH), one of a lowest control channel element index $(n_{CCE})$ and a lowest enhanced control channel element index $(n_{eCCE})$, receiving, on an enhanced physical downlink control channel (ePDCCH), a user equipment specific starting offset $(N_{PUCCH}^{(1)})$, receiving, on an enhanced physical downlink control channel (ePDCCH), at least one selected from an acknowledgement/non-acknowledgement (ACK/NACK) resource offset (ARO) value, an antenna port offset (AP), a maximum number of eCCE indices among the ePDCCH sets to a user equipment in a specified subframe $(N_m)$, an offset informed to the user equipment by higher layer signaling to avoid collision with the user equipment in coordinating cells $(N_{PUCCH,CoMP}^{(1)})$, and a value associated with one or more of a specific subframe, a signaled value, a physical downlink shared channel, and a semi-persistent scheduling (SPS) and determining allocation of an uplink resource of a physical uplink control channel (PUCCH) for HARQ-ACK transmission based on the one of a lowest control channel element index $(n_{CCE})$ and a lowest enhanced control channel element index $(n_{eCCE})$ and the user equipment specific starting offset $(N_{PUCCH}^{(1)})$, and at least one selected from an acknowledgement/non-acknowledgement (ACK/NACK) resource offset (ARO) value, an antenna port offset (AP), a maximum number of eCCE indices among the ePDCCH sets to a user equipment in a specified subframe $(N_m)$, an offset informed to the user equipment by higher layer signaling to avoid collision with the user equipment in coordinating cells $(N_{PUCCH,CoMP}^{(1)})$, and a value associated with one or more of a specific subframe, a signaled value, a physical downlink shared channel, and a semi-persistent scheduling (SPS).

In Example 14 the subject matter of Example 13 may optionally include, wherein the receiving a user equipment specific starting offset $(N_{PUCCH}^{(1)})$ further comprises receiving a user equipment specific starting offset for a detected ePDCCH set configured by RRC signaling $(N_{PUCCH,m}^{(1)})$.

In Example 15 the subject matter of any one or more of Examples 13-14 may optionally include, wherein the determining allocation of an uplink resource of a physical uplink control channel (PUCCH) for HARQ-ACK transmission comprises determining an ARI-based allocation of an uplink resource of a PUCCH for HARQ-ACK transmission using a backward compatible carrier $(n_{PUCCH}^{(1)})$ is given by $f(n_{eCCE})$+ARI+$N_{PUCCH,m}^{(1)}$, wherein $f(n_{eCCE})$ is a function of the lowest enhanced control channel element index $(n_{eCCE})$.

In Example 16 the subject matter of any one or more of Examples 13-15 may optionally include, wherein the determining allocation of an uplink resource of a physical uplink control channel (PUCCH) for HARQ-ACK transmission comprises determining an AP-based allocation of an uplink resource of a PUCCH for HARQ-ACK transmission for a new carrier type (NCT) is given by one of $f(n_{eCCE})$+2·AP or $f(n_{ECCE,m})$+AP+$N_{PUCCH,m}^{(1)}$, wherein $f(n_{ECCE,m})$ is a function of the lowest eCCE index for the detected ePDCCH to the user equipment at ePDCCH set m, wherein m=0, 1, ..., M−1 and M is the number of ePDCCH sets to the user equipment.

In Example 17 the subject matter of any one or more of Examples 13-16 may optionally include, wherein the determining allocation of an uplink resource of a physical uplink control channel (PUCCH) for HARQ-ACK transmission comprises determining an hybrid allocation of an uplink resource of a PUCCH for HARQ-ACK transmission using a backward compatible carrier $(n_{PUCCH}^{(1)})$ is given by $f(n_{eCCE,m})$+ARI+AP+$N_{PUCCH,m}^{(1)}$.

In Example 18 the subject matter of any one or more of Examples 13-17 may optionally include, wherein the determining allocation of an uplink resource of a physical uplink control channel (PUCCH) for HARQ-ACK transmission comprises determining an AP-based allocation of an uplink resource of a PUCCH for HARQ-ACK transmission for a new carrier type (NCT) is given by $f(n_{eCCE,m})$+AP+$N_{PUCCH,m}^{(1)}$.

In Example 19 the subject matter of any one or more of Examples 13-18 may optionally include, wherein the determining allocation of an uplink resource of a physical uplink control channel (PUCCH) for HARQ-ACK transmission comprises determining allocation of an uplink resource of a physical uplink control channel (PUCCH) for HARQ-ACK bundling for resource allocation for subframe n for an enhanced PDCCH transmission according to:

$n_{PUCCH}^{(1,\tilde{p}_0)}=n_{eCCE,q}+\Sigma_{il=0}^{m-1}N_{eCCE,q,n-k_n}+\Delta_{ARO}+N_{PUCCH,q}^{(e1)}$ if ePDCCH-PRB-set q is configured for distributed transmission, and $$n_{PUCCH}^{(1,\tilde{p}_0)} = \left\lfloor \frac{n_{eCCE,q}}{N_{RB}^{eCCE,q}} \right\rfloor n_{eCCE,q} + \sum_{il=0}^{m-1} N_{eCCE,q,n-k_n} + n' + \Delta_{ARO} + N_{PUCCH,q}^{(e1)}$$

if ePDCCH-PRB-set q is configured for localized transmission.

In Example 20 the subject matter of any one or more of Examples 13-19 may optionally include, wherein the determining allocation of an uplink resource of a physical uplink control channel (PUCCH) for HARQ-ACK transmission comprises determining an ARI-based allocation of an uplink resource of a PUCCH for HARQ-ACK transmission given by value+$n_{eCCE}$,s+ARI+$N_{PUCCH,s}^{(1)}$, wherein the value is associated with one or more of a specific subframe, a signaled value, a physical downlink shared channel, and a semi-persistent scheduling (SPS).

In Example 21 the subject matter of any one or more of Examples 13-20 may optionally include, wherein the determining allocation of an uplink resource of a physical uplink control channel (PUCCH) for HARQ-ACK transmission comprises one selected from determining, for an enhanced PDCCH used in a subframe and configured for PUCCH format 3, an allocation of an uplink resource of a PUCCH for HARQ-ACK transmission based on the ARI offset value, determining, for an enhanced PDCCH used in a subframe and configured for PUCCH format 3, an allocation of an uplink resource of a PUCCH for HARQ-ACK transmission using transmit power controls (TPCs), other than in a subframe having downlink assignment index (DAI) equal to one on a primary cell, to indicate a used PUCCH format 3 resource among four configured resources, determining, for an enhanced PDCCH used in a subframe and configured for one of a PUCCH format 3 and PUCCH format 1b with channel selection for the user equipment configured for carrier aggregation, an allocation of an uplink resource of a PUCCH for HARQ-ACK transmission that includes the ARI offset value for an enhanced PDCCHs transmitted on a primary cell and determining the allocation of the uplink resource of the PUCCH for HARQ-ACK transmission using a user equipment specific starting offset for enhanced PDCCH set s configured by RRC signaling for a downlink (DL) subframe for enhanced PDCCH and using a cell specific starting offset for enhanced PDCCH set s configured by RRC signaling for DL subframes associated with legacy PDCCH.

In Example 22 the subject matter of any one or more of Examples 13-21 may optionally include, wherein the determining allocation of an uplink resource of a physical uplink control channel (PUCCH) for HARQ-ACK transmission comprises transmitting a HARQ-ACK PUCCH resource value on each PDCCH assignment in a primary cell and in each secondary cell to determine the PUCCH resource value within a subframe.

In Example 23 the subject matter of any one or more of Examples 13-22 may optionally include, further comprising receiving a single physical downlink shared channel (PDSCH) on a primary cell with the PDCCH having a DAI equal to one and using PUCCH format 1a/1b with dynamic resource allocation for allocation of an uplink resource of a physical uplink control channel (PUCCH) for HARQ-ACK transmission.

In Example 24 the subject matter of any one or more of Examples 13-23 may optionally include, further comprises using only one of an enhanced physical downlink control channel and a legacy physical downlink control channel for downlink subframes.

In Example 25 may include subject matter (such as means for performing acts or machine readable medium including instructions that, when executed by the machine, cause the machine to perform acts) including receiving, on an enhanced physical downlink control channel (ePDCCH), one of a lowest control channel element index ($n_{CCE}$) and a lowest enhanced control channel element index (neCCE), receiving, on an enhanced physical downlink control channel (ePDCCH), a user equipment specific starting offset ($N_{PUCCH}^{(1)}$), receiving, on an enhanced physical downlink control channel (ePDCCH), at least one selected from an acknowledgement/non-acknowledgement (ACK/NACK) resource offset (ARO) value, an antenna port offset (AP), a maximum number of eCCE indices among the ePDCCH sets to a user equipment in a specified subframe (Nm), an offset informed to the user equipment by higher layer signaling to avoid collision with the user equipment in coordinating cells ($N_{PUCCH,CoMP}^{(1)}$), and a value associated with one or more of a specific subframe, a signaled value, a physical downlink shared channel, and a semi-persistent scheduling (SPS) and determining allocation of an uplink resource of a physical uplink control channel (PUCCH) for HARQ-ACK transmission based on the one of a lowest control channel element index (nCCE) and a lowest enhanced control channel element index ($n_{eCCE}$) and the user equipment specific starting offset ($N_{PUCCH}^{(1)}$), and at least one selected from an acknowledgement/non-acknowledgement (ACK/NACK) resource offset (ARO) value, an antenna port offset (AP), a maximum number of eCCE indices among the ePDCCH sets to a user equipment in a specified subframe ($N_m$), an offset informed to the user equipment by higher layer signaling to avoid collision with the user equipment in coordinating cells ($N_{PUCCH,CoMP}^{(1)}$), and a value associated with one or more of a specific subframe, a signaled value, a physical downlink shared channel, and a semi-persistent scheduling (SPS).

In Example 26 the subject matter of Example 25 may optionally include, wherein the receiving a user equipment specific starting offset ($N_{PUCCH}^{(1)}$) further comprises receiving a user equipment specific starting offset for a detected ePDCCH set configured by RRC signaling ($N_{PUCCH,m}^{(1)}$).

In Example 27 the subject matter of any one or more of Examples 25-26 may optionally include, wherein the determining allocation of an uplink resource of a physical uplink control channel (PUCCH) for HARQ-ACK transmission comprises determining an ARI-based allocation of an uplink resource of a PUCCH for HARQ-ACK transmission using a backward compatible carrier ($n_{PUCCH}^{(1)}$) is given by $f(n_{eCCE})+ARI+N_{PUCCH,m}^{(1)}$, wherein $f(n_{eCCE})$ is a function of the lowest enhanced control channel element index (neCCE).

In Example 28 the subject matter of any one or more of Examples 25-27 may optionally include, wherein the determining allocation of an uplink resource of a physical uplink control channel (PUCCH) for HARQ-ACK transmission comprises determining an AP-based allocation of an uplink resource of a PUCCH for HARQ-ACK transmission for a new carrier type (NCT) is given by one of $f(n_{eCCE})+2\cdot AP$ or $f(n_{ECCE,m})+AP+N_{PUCCH,m}^{(1)}$, wherein $f(n_{ECCE,m})$ is a function of the lowest eCCE index for the detected ePDCCH to the user equipment at ePDCCH set m, wherein m=0, 1, ..., M−1 and M is the number of ePDCCH sets to the user equipment.

In Example 29 the subject matter of any one or more of Examples 25-28 may optionally include, wherein the determining allocation of an uplink resource of a physical uplink control channel (PUCCH) for HARQ-ACK transmission comprises determining an hybrid allocation of an uplink resource of a PUCCH for HARQ-ACK transmission using a backward compatible carrier ($n_{PUCCH}^{(1)}$) is given by $f(n_{eCCE,m})+ARI+AP+N_{PUCCH,m}^{(1)}$.

In Example 30 the subject matter of any one or more of Examples 25-29 may optionally include, wherein the determining allocation of an uplink resource of a physical uplink control channel (PUCCH) for HARQ-ACK transmission comprises determining an AP-based allocation of an uplink resource of a PUCCH for HARQ-ACK transmission for a new carrier type (NCT) is given by $f(n_{eCCE,m})+AP+N_{PUCCH,m}^{(1)}$.

In Example 31 the subject matter of any one or more of Examples 25-30 may optionally include, wherein the determining allocation of an uplink resource of a physical uplink control channel (PUCCH) for HARQ-ACK transmission comprises determining allocation of an uplink resource of a physical uplink control channel (PUCCH) for HARQ-ACK bundling for resource allocation for subframe n for an enhanced PDCCH transmission according to given by:

$$n_{PUCCH}^{(1,\tilde{p}_0)} = n_{eCCE,q} + \Sigma_{il=0}^{m-1} N_{eCCE,q,n-k_n} + \Delta_{ARO} + N_{PUCCH,q}^{(e1)}$$

if ePDCCH-PRB-set q is configured for distributed transmission, and $$n_{PUCCH}^{(1,\tilde{p}_0)} = \left\lfloor \frac{n_{eCCE,q}}{N_{RB}^{eCCE,q}} \right\rfloor n_{eCCE,q} + \sum_{il=0}^{m-1} N_{eCCE,q,n-k_n} + n' + \Delta_{ARO} + N_{PUCCH,q}^{(e1)}$$

if ePDCCH-PRB-set q is configured for localized transmission.

In Example 32 the subject matter of any one or more of Examples 25-31 may optionally include, wherein the determining allocation of an uplink resource of a physical uplink control channel (PUCCH) for HARQ-ACK transmission comprises determining an ARI-based allocation of an uplink resource of a PUCCH for HARQ-ACK transmission given by value+$n_{eCCE,s}$+ARI+$N_{PUCCH,s}^{(1)}$, wherein the value is associated with one or more of a specific subframe, a signaled value, a physical downlink shared channel, and a semi-persistent scheduling (SPS).

In Example 33 the subject matter of any one or more of Examples 25-32 may optionally include, wherein the determining allocation of an uplink resource of a physical uplink control channel (PUCCH) for HARQ-ACK transmission comprises one selected from determining, for an enhanced PDCCH used in a subframe and configured for PUCCH format 3, an allocation of an uplink resource of a PUCCH for HARQ-ACK transmission based on the ARI offset value, determining, for an enhanced PDCCH used in a subframe and configured for PUCCH format 3, an allocation of an uplink resource of a PUCCH for HARQ-ACK transmission using transmit power controls (TPCs), other than in a subframe having downlink assignment index (DAI) equal to one on a primary cell, to indicate a used PUCCH format 3 resource among four configured resources, determining, for an enhanced PDCCH used in a subframe and configured for one of a PUCCH format 3 and PUCCH format 1b with channel selection for the user equipment configured for carrier aggregation, an allocation of an uplink resource of a PUCCH for HARQ-ACK transmission that includes the ARI offset value for an enhanced PDCCHs transmitted on a primary cell and determining the allocation of the uplink resource of the PUCCH for HARQ-ACK transmission using a user equipment specific starting offset for enhanced PDCCH set s configured by RRC signaling for a downlink (DL) subframe for enhanced PDCCH and using a cell specific starting offset for enhanced PDCCH set s configured by RRC signaling for DL subframes associated with legacy PDCCH.

In Example 34 the subject matter of any one or more of Examples 25-33 may optionally include, wherein the determining allocation of an uplink resource of a physical uplink control channel (PUCCH) for HARQ-ACK transmission comprises transmitting a HARQ-ACK PUCCH resource value on each PDCCH assignment in a primary cell and in each secondary cell to determine the PUCCH resource value within a subframe.

In Example 35 the subject matter of any one or more of Examples 25-34 may optionally include, further comprising receiving a single physical downlink shared channel (PDSCH) on a primary cell with the PDCCH having a DAI equal to one and using PUCCH format 1a/1b with dynamic resource allocation for allocation of an uplink resource of a physical uplink control channel (PUCCH) for HARQ-ACK transmission.

In Example 36 the subject matter of any one or more of Examples 25-35 may optionally include, further comprises using only one of an enhanced physical downlink control channel and a legacy physical downlink control channel for downlink subframes.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A user equipment comprising:
a receiver arranged to receive, on an enhanced physical downlink control channel (ePDCCH), a lowest control channel element index ($n_{CCE}$) and a lowest enhanced control channel element index ($n_{eCCE}$), a user equipment specific starting offset ($N_{PUCCH}^{(1)}$) and at least one additional offset-related parameter;
a processor arranged to determine allocation of an uplink resource of a physical uplink control channel (PUCCH) for Hybrid Automatic Repeat reQuest-ACKnowledgement (HARQ-ACK) transmission based on one of the lowest control channel element index ($n_{CCE}$) and the lowest enhanced control channel element index ($n_{eCCE}$), the user equipment specific starting offset ($N_{PUCCH}^{(1)}$) and the at least one additional offset-related parameter; and
a transmitter arranged to transmit a signal on the PUCCH using the allocated uplink resource, and the processor is further arranged to at least one of:
determine a hybrid allocation of an uplink resource of a PUCCH for HARQ-ACK transmission using a backward compatible carrier ($n_{PUCCH}^{(1)}$) is given by $f(n_{eCCE,m})$+an acknowledgement/non-acknowledgement (ACK/NACK) resource indicator (ARI)+an antenna port offset (AP)+$N_{PUCCH,m}^{(1)}$, and
determine an AP-based allocation of an uplink resource of a PUCCH for HARQ-ACK transmission for a new carrier type (NCT) is given by $f(n_{eCCE,m})$+AP+$N_{PUCCH,m}^{(1)}$.

2. The user equipment of claim 1, wherein the at least one additional offset-related parameter comprises at least one selected from an ACK/NACK resource offset (ARO) value, the AP, a maximum number of eCCE indices among all ePDCCH sets to a user equipment in a specified subframe ($N_m$), an offset informed to the user equipment by higher layer signaling to avoid collision with the user equipment in coordinating cells ($N_{PUCCH,CoMP}^{(1)}$), and a value associated with one or more of a specific subframe, a signaled value, a physical downlink shared channel, and a semi-persistent scheduling (SPS).

3. The user equipment of claim 1, wherein the receiver further receives a user equipment specific starting offset for a detected ePDCCH set configured by radio resource control (RRC) signaling ($N_{PUCCH,m}^{(1)}$).

4. The user equipment of claim 1, wherein the processor is further arranged to determine an ARI-based allocation of an uplink resource of a PUCCH for HARQ-ACK transmission using a backward compatible carrier ($n_{PUCCH}^{(1)}$) is given by $f(n_{eCCE})$+ARI+$N_{PUCCH,m}^{(1)}$, wherein $f(n_{eCCE})$ is a function of the lowest enhanced control channel element index ($n_{eCCE}$).

5. The user equipment of claim 1, wherein the processor is further arranged to determine a hybrid allocation of an uplink resource of a PUCCH for HARQ-ACK transmission using a backward compatible carrier ($n_{PUCCH}^{(1)}$) is given by $f(n_{eCCE,m})$+AP+$N_{PUCCH,m}^{(1)}$.

6. The user equipment of claim 1, wherein the processor is further arranged to determine an AP-based allocation of an uplink resource of a PUCCH for HARQ-ACK transmission for a new carrier type (NCT) is given by $f(n_{eCCE,m})$+AP+$N_{PUCCH,m}^{(1)}$.

7. The user equipment of claim 1, wherein the processor is further arranged to use only one of an enhanced physical downlink control channel and a legacy physical downlink control channel for downlink subframes.

8. A user equipment comprising:
a receiver arranged to receive, on an enhanced physical downlink control channel (ePDCCH), a lowest control channel element index ($n_{CCE}$) and a lowest enhanced control channel element index ($n_{eCCE}$), a user equipment specific starting offset ($N_{PUCCH}^{(1)}$) and at least one additional offset-related parameter;
a processor arranged to determine allocation of an uplink resource of a physical uplink control channel (PUCCH) for Hybrid Automatic Repeat reQuest-ACKnowledgement (HARQ-ACK) transmission based on one of the lowest control channel element index ($n_{CCE}$) and the lowest enhanced control channel element index ($n_{eCCE}$), the user equipment specific starting offset ($N_{PUCCH}^{(1)}$) and the at least one additional offset-related parameter; and
a transmitter arranged to transmit a signal on the PUCCH using the allocated uplink resource, wherein the processor is further arranged to:
determine an antenna port offset (AP)-based allocation of an uplink resource of a PUCCH for HARQ-ACK transmission for a new carrier type (NCT) is given by one of $f(n_{eCCE})$+2·AP or $f(n_{eCCE,m})$+AP+$N_{PUCCH,m}^{(1)}$, wherein $f(n_{eCCE,m})$ is a function of the lowest eCCE index for the detected ePDCCH to the user equipment at ePDCCH set m, wherein m=0, 1, ..., M−1 and M is the number of ePDCCH sets to the user equipment.

9. A user equipment comprising:
a receiver arranged to receive, on an enhanced physical downlink control channel (ePDCCH), a lowest control channel element index ($n_{CCE}$) and a lowest enhanced control channel element index ($n_{eCCE}$), a user equipment specific starting offset ($N_{PUCCH}^{(1)}$) and at least one additional offset-related parameter;
a processor arranged to determine allocation of an uplink resource of a physical uplink control channel (PUCCH) for Hybrid Automatic Repeat reQuest-ACKnowledgement (HARQ-ACK) transmission based on one of the lowest control channel element index ($n_{CCE}$) and the lowest enhanced control channel element index ($n_{eCCE}$), the user equipment specific starting offset ($N_{PUCCH}^{(1)}$) and the at least one additional offset-related parameter; and
a transmitter arranged to transmit a signal on the PUCCH using the allocated uplink resource, wherein the processor is further arranged to:
determine allocation of an uplink resource of the PUCCH for HARQ-ACK bundling for resource allocation for subframe n for an ePDCCH transmission is given by:

$$n_{PUCCH}^{(1,\tilde{p}_1)} = n_{eCCE,q} + 1 + \sum_{il=0}^{m-1} N_{eCCE,q,n-k_n} + \Delta_{ARO} + N_{PUCCH,q}^{(e1)}$$

if ePDCCH-PRB-set q is configured for distributed transmission, and an equation including the terms:

$$\left\lfloor \frac{n_{eCCE,q}}{N_{RB}^{eCCE,q}} \right\rfloor, \sum_{il=0}^{m-1} N_{eCCE,q,n-k_{il}}, n', \Delta_{ARO},$$

and $$N_{PUCCH,q}^{(e1)}$$

if ePDCCH-PRB-set q is configured for localized transmission.

10. A user equipment comprising:
a receiver arranged to receive, on an enhanced physical downlink control channel (ePDCCH), a lowest control channel element index ($n_{CCE}$) and a lowest enhanced control channel element index ($n_{eCCE}$), a user equipment specific starting offset ($N_{PUCCH}^{(1)}$) and at least one additional offset-related parameter;
a processor arranged to determine allocation of an uplink resource of a physical uplink control channel (PUCCH) for Hybrid Automatic Repeat reQuest-ACKnowledgement (HARQ-ACK) transmission based on one of the lowest control channel element index ($n_{CCE}$) and the lowest enhanced control channel element index ($n_{eCCE}$), the user equipment specific starting offset ($N_{PUCCH}^{(1)}$) and the at least one additional offset-related parameter; and
a transmitter arranged to transmit a signal on the PUCCH using the allocated uplink resource, wherein the processor is further arranged to:
determine an acknowledgement/non-acknowledgement (ACK/NACK) resource indicator (ARI)-based allocation of an uplink resource of a PUCCH for HARQ-ACK transmission given by value+$n_{eCCE,s}$+ARI+$N_{PUCCH,s}^{(1)}$, wherein the value is associated with one or more of a specific subframe, a signaled value, a physical downlink shared channel, and a semi-persistent scheduling (SPS);
determine, for an ePDCCH used in a subframe and configured for PUCCH format 3, an allocation of an uplink resource of a PUCCH for HARQ-ACK transmission based on the ARI offset value;
determine, for an ePDCCH used in a subframe and configured for PUCCH format 3, an allocation of an uplink resource of a PUCCH for HARQ-ACK transmission using transmit power controls (TPCs), other than in a subframe having downlink assignment index (DAI) equal to one on a primary cell, to indicate a used PUCCH format 3 resource among four configured resources;
determine, for an ePDCCH used in a subframe and configured for one of a PUCCH format 3 and PUCCH format 1b with channel selection for the user equipment configured for carrier aggregation, an allocation of an uplink resource of a PUCCH for HARQ-ACK transmission that includes the ARI offset value for an ePDCCH transmitted on a primary cell; and
determine the allocation of the uplink resource of the PUCCH for HARQ-ACK transmission using a user equipment specific starting offset for ePDCCH set s configured by RRC signaling for a downlink (DL) subframe for ePDCCH and using a cell specific starting offset for ePDCCH set s configured by RRC signaling for DL subframes associated with legacy PDCCH.

11. A user equipment comprising:
a receiver arranged to receive, on an enhanced physical downlink control channel (ePDCCH), a lowest control channel element index ($n_{CCE}$) and a lowest enhanced control channel element index ($n_{eCCE}$), a user equipment specific starting offset ($N_{PUCCH}^{(1)}$) and at least one additional offset-related parameter;
a processor arranged to determine allocation of an uplink resource of a physical uplink control channel (PUCCH) for Hybrid Automatic Repeat reQuest-ACKnowledgement (HARQ-ACK) transmission based on one of the lowest control channel element index ($n_{CCE}$) and the lowest enhanced control channel element index ($n_{eCCE}$), the user equipment specific starting offset ($N_{PUCCH}^{(1)}$) and the at least one additional offset-related parameter; and
a transmitter arranged to transmit a signal on the PUCCH using the allocated uplink resource, wherein the processor is further arranged to:
transmit a HARQ-ACK PUCCH resource value on each PDCCH assignment in a primary cell and in each secondary cell to determine the PUCCH resource value within a subframe and to receive a single physical downlink shared channel (PDSCH) on a primary cell with the PDCCH having a DAI equal to one, the processor using PUCCH format 1a/1b with dynamic resource allocation for allocation of an uplink resource of the PUCCH for HARQ-ACK transmission.

12. A method for providing dynamic Hybrid Automatic Repeat reQuest-ACKnowledgement (HARQ-ACK) transmission with enhanced physical downlink control channel resource allocation, comprising:
receiving, on an enhanced physical downlink control channel (ePDCCH), a lowest control channel element index ($n_{CCE}$) and a lowest enhanced control channel element index ($n_{eCCE}$);
receiving, on the ePDCCH, a user equipment specific starting offset ($N_{PUCCH}^{(1)}$);
receiving, on the ePDCCH, at least one value selected from an acknowledgement/non-acknowledgement (ACK/NACK) resource offset (ARO) value, an antenna port offset (AP), a maximum number of eCCE indices among all ePDCCH sets to a user equipment in a specified subframe ($N_m$), an offset informed to the user equipment by higher layer signaling to avoid collision with the user equipment in coordinating cells ($N_{PUCCH,CoMP}^{(1)}$), and a value associated with one or more of a specific subframe, a signaled value, a physical downlink shared channel, and a semi-persistent scheduling (SPS); and
determining allocation of an uplink resource of a physical uplink control channel (PUCCH) for HARQ-ACK transmission based on one of the lowest control channel element index ($n_{CCE}$) and the lowest enhanced control channel element index ($n_{eCCE}$), the user equipment specific starting offset ($N_{PUCCH}^{(1)}$), and the at least one value, and at least one of:
the determining allocation of an uplink resource of the PUCCH for HARQ-ACK transmission comprises determining an antenna port offset (AP)-based allocation of an uplink resource of a PUCCH for HARQ-ACK transmission for a new carrier type (NCT) is given by one of $f(n_{eCCE})+2\cdot AP$ or $f(n_{eCCE,m})+AP+N_{PUCCH,m}^{(1)}$, wherein $f(n_{eCCE,m})$ is a function of the lowest eCCE index for the detected ePDCCH to the user equipment at ePDCCH set m, wherein m=0, 1, ..., M−1 and M is the number of ePDCCH sets to the user equipment, and the method further comprises receiving a single physical downlink shared channel (PDSCH) on a primary cell with the PDCCH having a DAI equal to one and using PUCCH format 1a/1b with dynamic resource allocation for allocation of an uplink resource of the PUCCH for HARQ-ACK transmission.

13. The method of claim 12, wherein the receiving a user equipment specific starting offset ($N_{PUCCH}^{(1)}$) further comprises receiving a user equipment specific starting offset for a detected ePDCCH set configured by RRC signaling ($N_{PUCCH,m}^{(1)}$).

14. The method of claim 12, wherein the determining allocation of an uplink resource of the PUCCH for HARQ-ACK transmission comprises determining an ACK/NACK resource indicator (ARI)-based allocation of an uplink resource of a PUCCH for HARQ-ACK transmission using a backward compatible carrier ($n_{PUCCH}^{(1)}$) is given by $f(n_{eCCE})$+ARI+$N_{PUCCH,m}^{(1)}$, wherein $f(n_{eCCE})$ is a function of the lowest enhanced control channel element index ($n_{eCCE}$).

15. The method of claim 12, wherein the determining allocation of an uplink resource of the PUCCH for HARQ-ACK transmission comprises determining an AP-based allocation of an uplink resource of a PUCCH for HARQ-ACK transmission for a new carrier type (NCT) is given by one of $f(n_{eCCE})$+2·AP or $f(n_{eCCE,m})$+AP+$N_{PUCCH,m}^{(1)}$, wherein $f(n_{eCCE,m})$ is a function of the lowest eCCE index for the detected ePDCCH to the user equipment at ePDCCH set m, wherein m=0, 1, ..., M−1 and M is the number of ePDCCH sets to the user equipment.

16. The method of claim 12, wherein the determining allocation of an uplink resource of the PUCCH for HARQ-ACK transmission comprises one selected from a group consisting of:

determining a hybrid allocation of an uplink resource of a PUCCH for HARQ-ACK transmission using a backward compatible carrier ($n_{PUCCH}^{(1)}$) is given by $f(n_{eCCE,m})$+ACK/NACK resource indicator (ARI)+AP+$N_{PUCCH,m}^{(1)}$, determining an AP-based allocation of an uplink resource of a PUCCH for HARQ-ACK transmission for a new carrier type (NCT) is given by $f(n_{eCCE,m})$+AP+$N_{PUCCH,m}^{(1)}$, determining an ARI-based allocation of an uplink resource of a PUCCH for HARQ-ACK transmission given by a value+$n_{eCCE,s}$+ARI+$N_{PUCCH,s}^{(1)}$, wherein the value is associated with one or more of a specific subframe, a signaled value, a physical downlink shared channel, and a semi-persistent scheduling (SPS), and determining allocation of an uplink resource of the PUCCH for HARQ-ACK bundling for resource allocation for subframe n for an enhanced PDCCH transmission according to:

$$n_{PUCCH}^{(1,\tilde{p}_1)} = n_{eCCE,q} + \sum_{il=0}^{m-1} N_{eCCE,q,n-k_n} + \Delta_{ARO} + N_{PUCCH,q}^{(e1)}$$

if ePDCCH-PRB-set q is configured for distributed transmission, and an equation including the terms:

$$\left\lfloor \frac{n_{eCCE,q}}{N_{RB}^{eCCE,q}} \right\rfloor, \sum_{il=0}^{m-1} N_{eCCE,q,n-k_{il}}, n', \Delta_{ARO},$$

and $N_{PUCCH,q}^{(e1)}$

If ePDCCH-PRB-set q is configured for localized transmission.

17. The method of claim 12, wherein the determining allocation of an uplink resource of the PUCCH for HARQ-ACK transmission comprises one selected from:

determining, for an enhanced PDCCH used in a subframe and configured for PUCCH format 3, an allocation of an uplink resource of a PUCCH for HARQ-ACK transmission based on an ACK/NACK resource indicator (ARI) offset value;

determining, for an enhanced PDCCH used in a subframe and configured for PUCCH format 3, an allocation of an uplink resource of a PUCCH for HARQ-ACK transmission using transmit power controls (TPCs), other than in a subframe having downlink assignment index (DAI) equal to one on a primary cell, to indicate a used PUCCH format 3 resource among four configured resources;

determining, for an enhanced PDCCH used in a subframe and configured for one of a PUCCH format 3 and PUCCH format 1b with channel selection for the user equipment configured for carrier aggregation, an allocation of an uplink resource of a PUCCH for HARQ-ACK transmission that includes the ARI offset value for an ePDCCH transmitted on a primary cell; and determining the allocation of the uplink resource of the PUCCH for HARQ-ACK transmission using a user equipment specific starting offset for ePDCCH set s configured by RRC signaling for a downlink (DL) subframe for ePDCCH and using a cell specific starting offset for ePDCCH set s configured by RRC signaling for DL subframes associated with legacy PDCCH.

18. The method of claim 12 further comprising receiving a single physical downlink shared channel (PDSCH) on a primary cell with the PDCCH having a DAI equal to one and using PUCCH format 1a/1b with dynamic resource allocation for allocation of an uplink resource of the PUCCH for HARQ-ACK transmission.

19. The method of claim 12 further comprises using only one of an enhanced physical downlink control channel and a legacy physical downlink control channel for downlink subframes.

20. At least one non-transitory machine readable medium comprising instructions that, when executed by the machine, cause the machine to perform operations for providing dynamic Hybrid Automatic Repeat reQuest-ACKnowledgement (HARQ-ACK) transmission with enhanced physical downlink control channel resource allocation, the operations comprising:

receiving, on an enhanced physical downlink control channel (ePDCCH), a lowest control channel element index ($n_{CCE}$) and a lowest enhanced control channel element index ($n_{eCCE}$);

receiving, on the ePUCCH, a user equipment specific starting offset ($N_{PUCCH}^{(1)}$);

receiving, on the ePUCCH, at least one value selected from an acknowledgement/non-acknowledgement (ACK/NACK) resource offset (ARO) value, an antenna port offset (AP), a maximum number of eCCE indices among all ePDCCH sets to a user equipment in a specified subframe ($N_m$), an offset informed to the user equipment by higher layer signaling to avoid collision with the user equipment in coordinating cells ($N_{PUCCH,CoMP}^{(1)}$), and a value associated with one or more of a specific subframe, a signaled value, a physical downlink shared channel, and a semi-persistent scheduling (SPS); and determining allocation of an uplink resource of a physical uplink control channel (PUCCH) for HARQ-ACK transmission based on one of a lowest control channel element index ($n_{CCE}$) and the lowest enhanced control channel element index ($n_{eCCE}$), and the user equipment specific starting offset ($N_{PUCCH}^{(1)}$), and the at least one value, and the determining allocation of an uplink resource of the PUCCH for HARQ-ACK transmission comprises determining an antenna port offset (AP)-based allocation of an uplink resource of a PUCCH for HARQ-ACK transmission for a new carrier type (NCT) is given by one of $f(n_{eCCE})+2\cdot AP$ or $f(n_{eCCE,m})+AP+N_{PUCCH,m}^{(1)}$, wherein $f(n_{eCCE,m})$ is a function of the lowest eCCE index for the detected ePDCCH to the user equipment at ePDCCH set m, wherein m=0, 1, ..., M−1 and M is the number of ePDCCH sets to the user equipment.

21. The at least one non-transitory machine readable medium of claim 20, wherein the receiving a user equipment specific starting offset ($N_{PUCCH}^{(1)}$) further comprises receiving a user equipment specific starting offset for a detected ePDCCH set configured by RRC signaling ($N_{PUCCH,m}^{(1)}$).

22. The at least one non-transitory machine readable medium of claim 20, wherein the determining allocation of an uplink resource of the PUCCH for HARQ-ACK transmission comprises determining an ACK/NACK resource indicator (ARI)-based allocation of an uplink resource of a PUCCH for HARQ-ACK transmission using a backward compatible carrier ($n_{PUCCH}^{(1)}$) is given by $f(n_{eCCE})+ARI+N_{PUCCH,m}^{(1)}$, wherein $f(n_{eCCE})$ is a function of the lowest enhanced control channel element index ($n_{eCCE}$).

23. The at least one non-transitory machine readable medium of claim 20, wherein the determining allocation of an uplink resource of the PUCCH for HARQ-ACK transmission comprises determining an AP-based allocation of an uplink resource of a PUCCH for HARQ-ACK transmission for a new carrier type (NCT) is given by one of $f(n_{eCCE})+2\cdot AP$ or $f(n_{eCCE,m})+AP+N_{PUCCH,m}^{(1)}$, wherein $f(n_{eCCE,m})$ is a function of the lowest eCCE index for the detected ePDCCH to the user equipment at ePDCCH set m, wherein m=0, 1, ..., M−1 and M is the number of ePDCCH sets to the user equipment.

24. The at least one non-transitory machine readable medium of claim 20, wherein the determining allocation of an uplink resource of the PUCCH for HARQ-ACK transmission comprises one selected from a group consisting of:

determining a hybrid allocation of an uplink resource of a PUCCH for HARQ-ACK transmission using a backward compatible carrier ($n_{PUCCH}^{(1)}$) is given by $f(n_{eCCE,m})+$ACK/NACK resource indicator (ARI)$+AP+N_{PUCCH,m}^{(1)}$, determining an ARI-based allocation of an uplink resource of a PUCCH for HARQ-ACK transmission given by a value $n_{eCCE,s}+ARI+N_{PUCCH,s}^{(1)}$, wherein the value is associated with one or more of a specific subframe, a signaled value, a physical downlink shared channel, and a semi-persistent scheduling (SPS), and determining allocation of an uplink resource of the PUCCH for HARQ-ACK bundling for resource allocation for subframe n for an ePDCCH transmission according to:

$$n_{PUCCH}^{(1,\tilde{p}_1)} = n_{eCCE,q} + 1 + \sum_{il=0}^{m-1} N_{eCCE,q,n-k_n} + \Delta_{ARO} + N_{PUCCH,q}^{(e1)}$$

if ePDCCH-PRB-set q is configured for distributed transmission, and an equation including the terms:

$$\left\lfloor \frac{n_{eCCE,q}}{N_{RB}^{eCCE,q}} \right\rfloor, \sum_{il=0}^{m-1} N_{eCCE,q,n-k_{il}}, n', \Delta_{ARO},$$

and $$N_{PUCCH,q}^{(e1)}$$

if ePDCCH-PRB-set q is configured for localized transmission.

25. The at least one non-transitory machine readable medium of claim 20, wherein the determining allocation of an uplink resource of the PUCCH for HARQ-ACK transmission comprises one selected from:

determining, for an ePDCCH used in a subframe and configured for PUCCH format 3, an allocation of an uplink resource of a PUCCH for HARQ-ACK transmission based on an ACK/NACK resource indicator (ARI) offset value;

determining, for an ePDCCH used in a subframe and configured for PUCCH format 3, an allocation of an uplink resource of a PUCCH for HARQ-ACK transmission using transmit power controls (TPCs), other than in a subframe having downlink assignment index (DAI) equal to one on a primary cell, to indicate a used PUCCH format 3 resource among four configured resources;

determining, for an ePDCCH used in a subframe and configured for one of a PUCCH format 3 and PUCCH format 1b with channel selection for the user equipment configured for carrier aggregation, an allocation of an uplink resource of a PUCCH for HARQ-ACK transmission that includes the ARI offset value for an ePDCCH transmitted on a primary cell; and determining the allocation of the uplink resource of the PUCCH for HARQ-ACK transmission using a user equipment specific starting offset for ePDCCH set s configured by RRC signaling for a downlink (DL) subframe for ePDCCH and using a cell specific starting offset for ePDCCH set s configured by RRC signaling for DL subframes associated with legacy PDCCH.

* * * * *